US005131079A

United States Patent [19]

Miyawaki et al.

[11] Patent Number: 5,131,079

[45] Date of Patent: Jul. 14, 1992

[54] METHOD OF CONTROLLING A DISPLAY AND A DISPLAY CONTROL DEVICE FOR A COPYING MACHINE

[75] Inventors: Shozo Miyawaki, Urawa; Mikio Miura, Sagamihara; Masashi Kuno; Takashi Tsutsumi, both of Tokyo; Masami Higuchi, Yokohama; Takeyoshi Sekine, Yokohama; Kouichi Kanaya, Yokohama; Yoshiyuki Tanimoto; Kazuhiro Ando, both of Tokyo, all of Japan

[73] Assignee: Ricoh Company, Ltd., Tokyo, Japan

[21] Appl. No.: 634,812

[22] Filed: Dec. 31, 1990

Related U.S. Application Data

[63] Continuation of Ser. No. 327,893, Mar. 23, 1989, abandoned.

[30] Foreign Application Priority Data

Mar. 28, 1988 [JP] Japan ................................ 63-73649
Apr. 21, 1988 [JP] Japan ................................ 63-99153
Apr. 22, 1988 [JP] Japan ............................ 63-54220[U]

[51] Int. Cl.[5] ...................... G06F 15/20; G03G 15/00

[52] U.S. Cl. .................................... 395/118; 355/206

[58] Field of Search ............... 355/200, 202, 206, 209, 355/208; 364/518, 519, 521; 395/118, 155, 161

[56] References Cited

U.S. PATENT DOCUMENTS

| | | | |
|---|---|---|---|
| Re. 32,253 | 9/1986 | Bartulis et al. | 355/209 |
| 4,248,524 | 2/1981 | Takahashi | 355/214 |
| 4,332,464 | 6/1982 | Bartulis et al. | 355/243 X |
| 4,390,265 | 6/1983 | Suzuki | 355/214 X |
| 4,402,591 | 9/1983 | Nakahata | 355/225 |
| 4,475,806 | 10/1984 | Daughton et al. | 355/14 R |
| 4,564,287 | 1/1986 | Suzuki | 355/246 X |
| 4,597,662 | 7/1986 | Hirata et al. | 355/14 R |
| 4,616,923 | 10/1986 | Renter | 355/208 |
| 4,711,560 | 12/1987 | Hosaka et al. | 355/200 |
| 4,714,944 | 12/1987 | Yoshiura | 355/55 |
| 4,724,462 | 2/1988 | Yamasaki et al. | 355/206 |
| 4,746,953 | 5/1988 | Knodt | 355/7 |
| 4,799,083 | 1/1989 | Knodt | 355/200 X |
| 4,803,463 | 2/1989 | Sado | 340/712 X |
| 4,814,824 | 3/1989 | Ito et al. | 355/200 |
| 4,870,458 | 9/1989 | Shibuya et al. | 355/200 |
| 4,896,223 | 1/1990 | Todome | 358/468 |

FOREIGN PATENT DOCUMENTS 0208641 11/1984 Japan ................................ 340/712

*Primary Examiner*—Heather R. Herndon
*Attorney, Agent, or Firm*—Oblon, Spivak, McClelland, Maier & Neustadt

[57] ABSTRACT

A method controls a display for a copying machine including a device having two-dimensional dot displaying device in which displaying layers for at least two colors of red and green are provided and capable of displaying at least four colors red, green, white, and black by combining the displaying layers. The method is made up of the steps of providing storing device including a memory space which corresponds to a display of the dot displaying device and in which addresses are sequentially assigned. The system then calculates display information of one-dimensional absolute address position information in response to display information in which coordinate information is made into two-dimensional coordinate information. This display information is stored in the storing device, and then supplied to the displaying device so as to be displayed. The display device is primarily a dot type device.

9 Claims, 36 Drawing Sheets

| |
|---|
| Fig.38 (i) |
| Fig.38 (ii) |

METHOD OF CONTROLLING A DISPLAY AND A DISPLAY CONTROL DEVICE FOR A COPYING MACHINE

This application is a continuation of application Ser. No. 07/327,893, filed on Mar. 23, 1989, now abandoned.

BACKGROUND OF THE INVENTION

The present invention relates to a method of controlling a display and a display control device for a copying machine.

In the conventional copying machines, there is a method structured in such a manner that the expression of the picture words using dots is controlled by a microcomputer and its control program is developed using only one-dimensional absolute address position information.

However, it needs a considerable quantity of manual calculations for the purpose of obtaining the one-dimensional absolute address position information upon the picture words since the control program is developed using only the one-dimensional absolute address position information. Therefore, it leads to a fact that a multiplicity of input and calculation errors inevitably occur at the time of inputting the one-dimensional absolute address position information. Furthermore, since such one-dimensional absolute address positions cannot be grasped intuitively, the pointing out and correction of such errors need a considerably elongated time to be taken. As a result, the development efficiency has not been insufficient.

Recently, the function of copying machines has been varied, and thereby handling the control panel thereof becomes too complicated.

However, if a great number of operation buttons and displays are disposed on the control panel to correspond to the thus-varied functions, a user who is not accustomed to handle this copying machine feels difficult to handle it and such machine becomes extremely difficult to be used. To this end, there are machines of the type arranged in such a manner that each of the keys are arranged to corresponds to a plurality of commands to be selectively used for the purpose of decrease the number of the keys. However, the machine of the type described above becomes further difficult to be handled by the user who is not accustomed to them, causing the operability to deteriorate.

In the actual use of the copying machines for which thus-varied functions have been provided, there is a tendency that only a limited number of the functions are frequently used and special functions tend to be rarely used even if an operator who is skilled in handling it. Accordingly, the structure arranged in such a manner that all of the keys and so on are disposed on the operation panel as to be always operated at needs is not advantageous for all of the users. On the contrary, the operability and the like deteriorate if the operator is not skilled in handling the copying machine.

As known, there are structures arranged in such a manner that the surface of a display such as cathode ray tube (CRT) or that of a liquid crystal display (LCD) is directly pushed at the time of performing the switching operation with the display of the same observed.

Therefore, a touch panel is conventionally used.

That is, such a touch panel comprises: a portion to be pushed; and a support portion, which are disposed away from each other by sandwiching therebetween glass beads or wires made of an insulating material in a manner of, for example, a matrix configuration.

The above-described portion to be pushed comprises: a flexible layer made of transparent resin; and an electrode layer disposed on the surface which opposes the surface which is arranged to be pushed by the operator's finger transparent material such as glass; and an electrode layer layered on the surface of this substrate layer confronting the above-described electrode layer of the portion to be pushed.

The thus-structured touch panel is arranged to be switched on or off by pushing a needed position for example with observing the image on the cathode ray tube as a result of an electric connection established by the contact between the electrode in the portion to be pushed and that of the support portion since the flexible layer in the portion to be pushed can be deformed.

In order to easily deform the flexible layer of above-described type of the portion to be pushed, some touch panels are arranged in such a manner that the thickness of the flexible layer is made considerably thin. It can lead to a fact that circuits connected to the touch panel can be broken due to a static electricity charged to a high potential when any charge body is brought into contact with the surface of the touch panel.

That is, when such a charged body is brought into contact with the touch panel, the static electricity from this charged body can discharge through each of the electrode layers, causing a so-called ground discharge phenomenon to occur.

Furthermore, the copying machines are arranged in such a manner that messages such as "Please wait", "You can copy", or the like are displayed in the display portion of the control panel by applying light from the reverse side (lower side) of printed characters by using LEDs or the like. In addition, the number of paper sheets to be set and the number of the copies are arranged to be displayed by using, for example, an LED of 7 segments. Therefore, in the conventional structure of the display portion of the type described above, the contents of the messages upon the state of the copying machine which can be displayed have been limited to a poor level such as the above-described messages "Please wait" and "You can copy". The other contents to be displayed are arranged to be expressed by using picture words representing a paper end mark and a toner end mark and so on. However, the expression using the picture words is difficult for a general users to understand them.

Therefore, there recently are copying machines of the type arranged in such a manner that a full-dot liquid crystal display (LCD) is used to serve as the display in the control panel of the copying machine as to realize a variety of expressions. In such a display, major parts thereof are arranged to serve as display areas upon the copy modes such as sorter, binding margin, double side, magnification, paper, density or the like. Furthermore, this display as well serves as input means of a type of touch switch. On the other hand, a minor part of this display is arranged to be a portion to display the messages, the number of paper sheets to be set, and the number of copies. Since this display is arranged to be a type full-dot display, a variety of messages such as "Warming up", "You can copy", "Copying", "Supply paper" and so on can be displayed in the message display areas. However, since the number of characters which can be displayed in the limited display area is limited, the state of the copying machine cannot be always properly indicated by the messages. There arises problems that the messages are inevitably limited to short messages.

SUMMARY OF THE INVENTION

It is a first object of the present invention to provide a method of controlling a display for a copying machine with which the development efficiency can be improved, processing speed can be raised, and the restrictions upon data volume, positions and display colors can be suspended.

It is a second object of the present invention to provide a display control device for a copying machine including a switch and display control device arranged to be a control panel exhibiting a utility which is capable of being at most simplified by making the display state correspond to the experience of the user and meeting the requirements for the purpose of improving the operability.

It is a third object of the present invention to provide a copying machine including a display device of a full dot type liquid crystal display with which necessary states upon the copying machine can be displayed with messages within its limited display area.

According to the present invention, the above-described first object can be achieved by: a method of controlling a display for a copying machine including a device having two-dimensional dot displaying means in which displaying layers for at least two colors of red and green are provided and capable of displaying at least four colors red, green, white, and black by combining the displaying layers, comprising the steps of providing storing means including a memory space which corresponds to a display of the dot displaying means and in which addresses are sequentially assigned, calculating display information of one-dimensional absolute address position information by calculating means in response to display information in which coordinate information is made two-dimensional coordinate information and storing the display information in the storing means, and supplying the display information from the storing means to the displaying means so as to be displayed by the displaying means.

Therefore, the development can be achieved by using the two-dimensional coordinate information so that an improved development efficiency can be obtained since a method of controlling a display realized by a copying machine including a device having two-dimensional dot displaying means in which displaying layers for at least two colors of red and green are provided and capable of displaying at least four colors red, green, white, and black by combining the displaying layers, comprises: storing means including a memory space which corresponds to a display of the dot display means and in which addresses are sequentially assigned, wherein display information of one-dimensional absolute address position information is calculated by calculating means in response to display information in which coordinate information is made two-dimensional coordinate information as to be stored in the storing means, and the display information is supplied from the storing means to the displaying means as to be displayed by the displaying means.

According to the present invention, the above-described second object can be achieved by a display control device for a copying machine comprising displaying means provided with a displaying element for displaying copying conditions, determining means formed as a transparent sheet-like matrix touch switch and layered on the displaying element of the displaying means for determining the copying conditions in response to a detection of the pressed position thereon, means for providing a plurality of display states to be displayed by the displaying means so as to be capable of inputting the copying conditions by means of the touch switch in response to the various display states, and means for optionally selecting one display state from the various display states.

As described above, since the copying machine including a switch and display control device comprises: displaying means using a displaying element such as liquid crystal or a fluorescent display tube for displaying copying operation regarding of information on transfer paper supply cassettes and copying operations such as a magnification; determining means formed as a transparent sheet-like matrix touch switch layered on the displaying element of the displaying means and capable of selecting the paper supply cassettes and magnification and so on in response to a detection of the pressed position thereon; means in which a plurality of display states displayed by the displaying means are provided and capable of making them correspond to the touch switch input state which is intended to realize an individual display states; and means for optionally selecting a display state from the various display states.

Consequently, the state of a control panel can be selected from states that are provided for the control panel in accordance with the operator's experience, causing the operability depending upon the performance of the operators to be improved.

According to the present invention, the above-described third object can be achieved by a display control device for a copying machine having a full dot liquid crystal display and capable of displaying messages upon the state of the copying machine, the number of the set paper sheet, and the number of copies, comprising display control means for changing the dot liquid crystal display in a manner to display the number of the set paper sheet and the number of copies in accordance with the state of the copying machine, and as well changing the area for displaying the messages.

According to the present invention, since the manner to display the number of the set paper sheets and the number of copies is varied in accordance with the sate of the copying machine, and the message displaying area is thereby changed in the full dot structure liquid crystal display, the function of displaying the number of the set paper sheets and copies can be achieved and necessary information upon the state of the copying machine can be displayed with messages in a limited area.

BRIEF DESCRIPTION OF THE DRAWINGS

FIG. 22 is a view illustrating a flow chart showing a macro used in the copying machine;

DESCRIPTION OF THE PREFERRED EMBODIMENT

An embodiment of the present invention will now be described with reference to the drawings.

Figure 2:
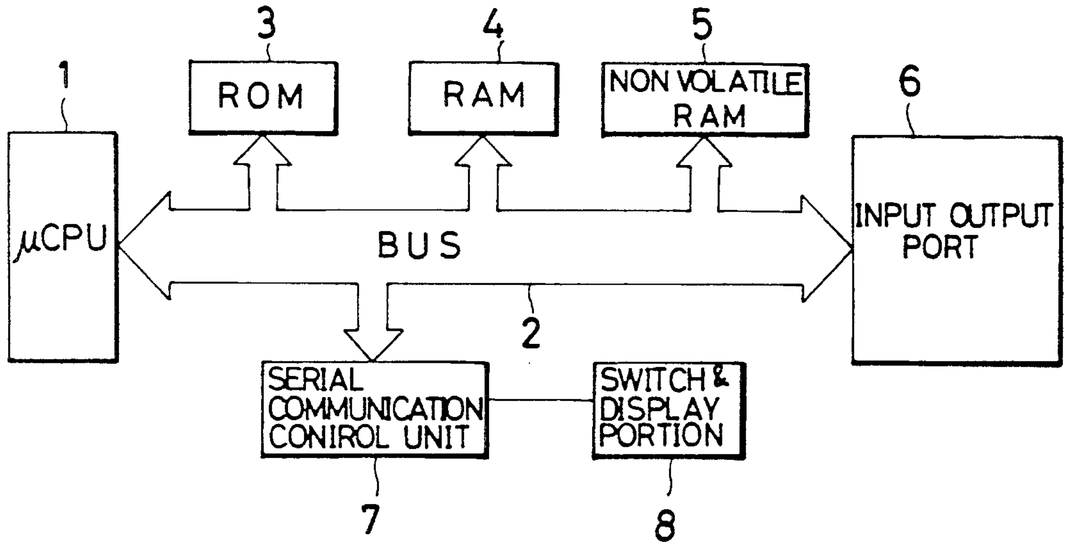
FIG. 2 is a block diagram of the overall structure of this invention.

First, the overall structure of the system of a copying machine in which a microprocessor μCPU 1 is used is shown in FIG. 2. That is, this microprocessor μCPU 1 serves as a control means so that the program of the copying machine is performed. A ROM 3 serving as a memory which stores a control program, RAM 4, nonvolatile memory 5, input and output port 6, and a serial communication control unit 7 are connected to this μCPU 1 via a bus line 2 for address, data and control. Output loads such as a motor or a solenoid in the copying machine and input sources such as sensors are connected to the input and output port 6. Furthermore, a switch and display portion 8 is connected to the serial communication control unit 7, this switch and display portion 8 supplying and receiving a signal through this serial communication control unit 7.

Figure 1:
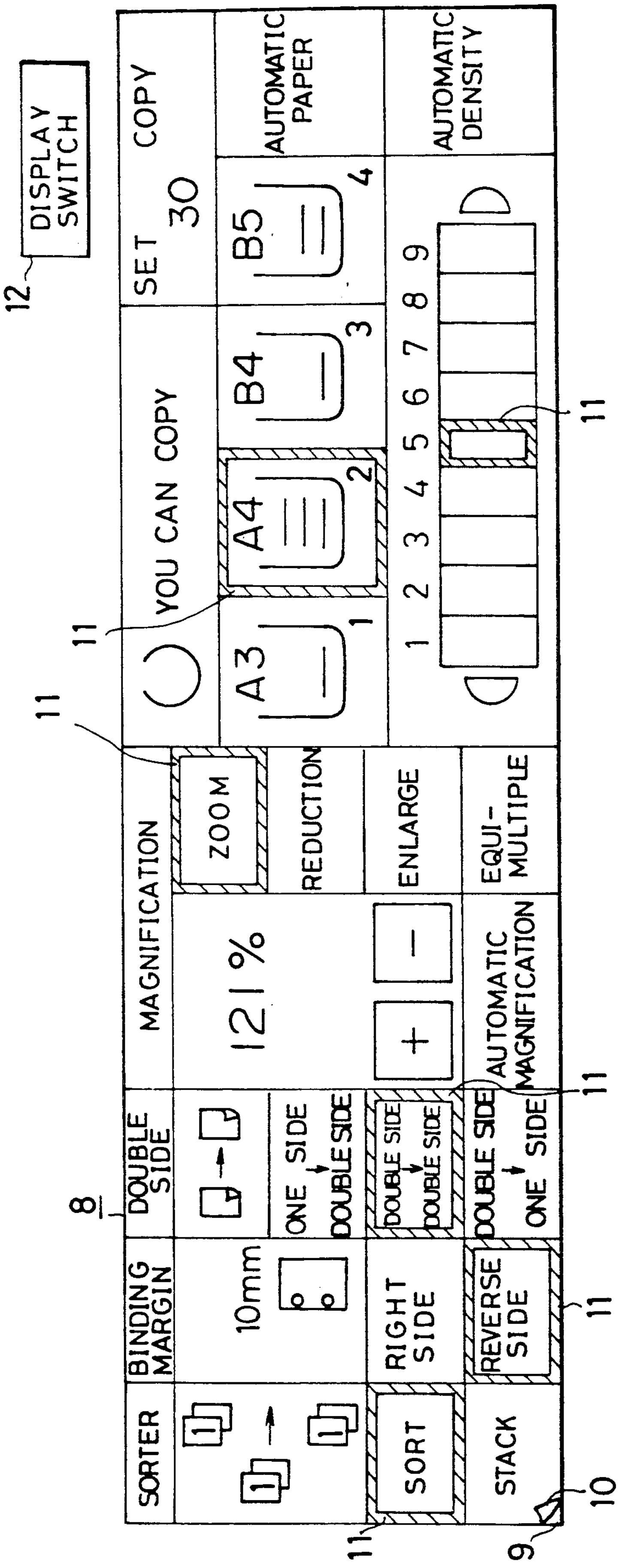
FIGS. 1(*a*) through FIG. 1(*c*) are a plan view illustrating a model of a part of a first embodiment of a display control device according to the present invention.
Figure 1B:
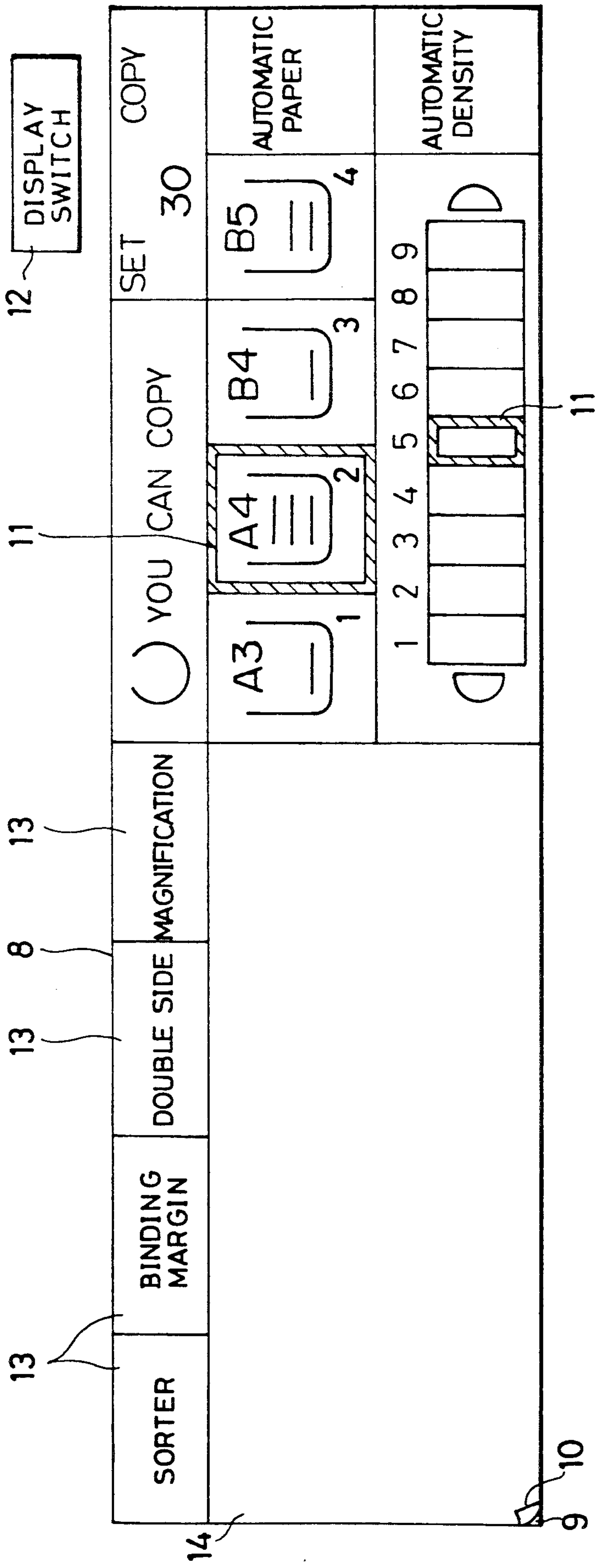
Figure 1C:
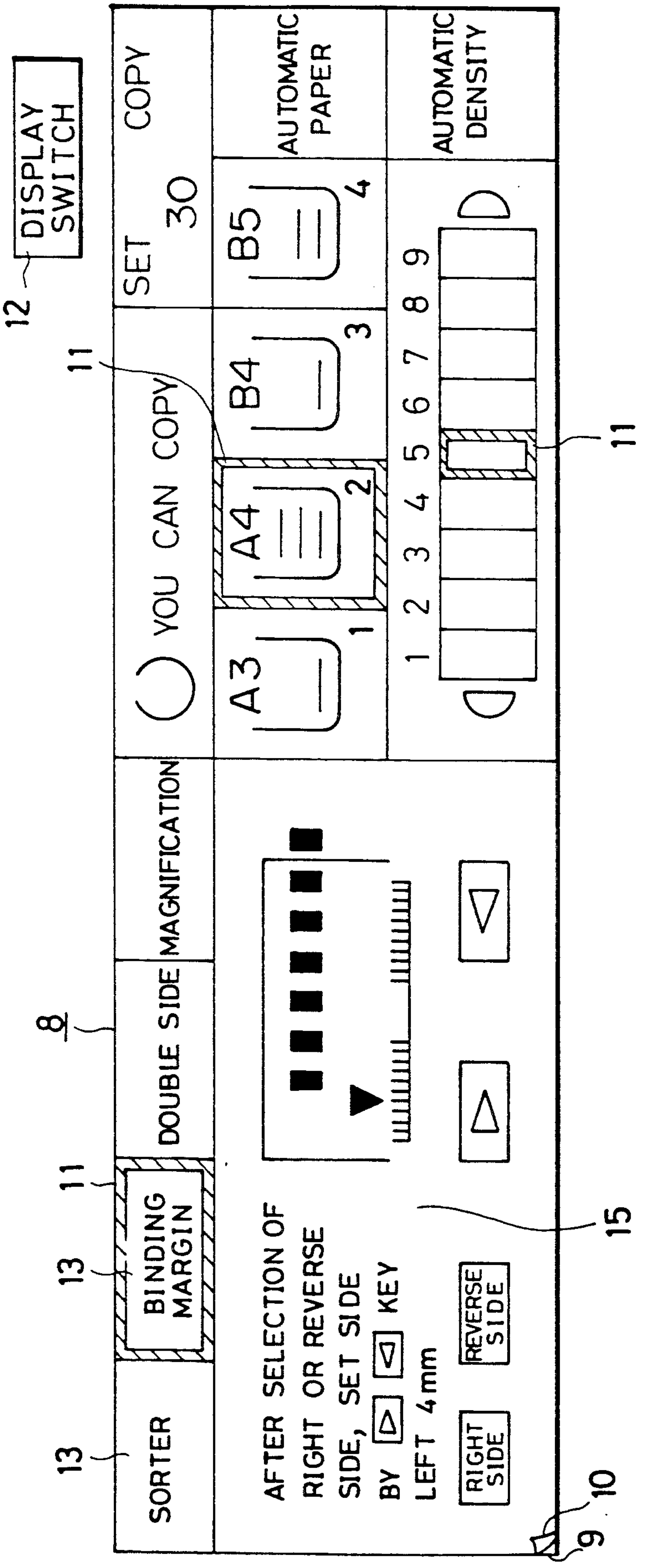

The structure of this switch and display portion 8 is shown in FIG. 1. FIG. 1 illustrates the model of the switch and display portion 8, this switch and display portion 8 being formed by stacking a determination portion 10 on a display means 9. The display means 9 disposed in the lower layer comprises a display element such as liquid crystal element or a fluorescent tube so that a variety of information items can be displayed. The displaying method may be selected from the group consisting of an image expression in a full-dot manner and a pattern expression in which patterns are used. As the display state realized by this display means 9, there are two available types of states: a first display state as shown in FIG. 1 (*a*) that is suitable for an exclusive operator who is skilled in operation of this copying machine; and a second display state as shown in FIG. 1 (*b*) or (*c*) that is suitable for a guest operator who is not skilled in the same.

First, the display realized by the display means 9 shown in FIG. 1 (*a*) will be described. It displays a various functions of the copying operation, they being information and functions of each of the copying modes such as a sorter function, a binding margin, double side function, magnification function, information on the paper supply cassette, information on the number of paper sheets to be set, and information on the density. As this sorter function, a sort mode and a stack mode can be used, and a sort key and a stack key are provided. As the binding margin function, there are a mode of 10 mm on the right side and a mode of 10 mm on the reverse side, and a right-side key and a reverse-side key are provided. As the double side function, there are a mode of one side-one side, a mode of one side-double side, a mode of double side-double side, and a mode of double side-one side. A selection key is respectively provided for each of these modes. As the magnification function, there are a reduction mode, an enlargement mode, an equimultiple mode, and an automatic multiplication mode for unifying the size in addition to the zoom magnifying mode. Therefore, there are a zoom key, a reduction key, an enlargement key, an equimultiple key, and an automatic magnifying key. Furthermore, a + key and a − key are provided for the purpose of enlarging or reducing the magnification every 1%. As information on the paper supply cassette, any of information upon A3 cassette, A4 cassette, B4 cassette or B5 cassette is selected. Therefore, there is a cassette selection key. Information on the number of paper sheets to be set is displayed by numerals. Information on the density is displayed by, for example, 9 notches from thin to dark.

As a method of displaying the selected present-mode with this display means 9, identification depending upon color, pattern, and light flash can be employed. In this embodiment, a display method is employed that the contour of the selected mode is, as shown in FIG. 1, made thick by a pattern 11.

For example, the case shown in FIG. 1 (*a*) corresponds to the case in which:

sorter mode: sort mode
binding margin mode: 10 mm on the reverse side
double side mode: double side original-double side copy
magnification mode: zoom mode of 121%
paper supply cassette: second paper supply cassette
density: intermediate level (notch 5)

are respectively selected.

On the other hand, the determination means 10 disposed above the display means 9 comprises a substantially transparent sheet-like matrix touch switch. It detects the pushed position which corresponds to the indicated content on the surface of the display means 9 as to enable the input by using the key. As a result, inputs corresponding to selected modes are performed. That is, the case shown in FIG. 1 (*a*) corresponds to the case in which the positions of the keys corresponding to the areas of "sort", "reverse", and "double-double" are pushed. When the key indicated as "stack" at the lower left corner is pushed in the state shown in FIG. 1 (*a*), the display of the outer contour pattern 11 is erased from the portion indicated as "sort", while the outer contour pattern 11 is displayed in the portion indicated as "stack". As a result, it means that the sorter mode has been changed into the stack mode.

FIG. 1 (*a*) illustrates one of the states of the switch display portion 8 which is suitable for a skilled operator. As described above, since all of the provided copying conditions can be determined on one control panel, a desired copying condition can be instantaneously set.

On the other hand, FIG. 1 (*b*) illustrates another state of the switch and display portion 8 which is suitable for a guest operator which are not skilled in operation this copying machine. The determination whether the state of display shown in FIG. 1 (*a*) or that shown in FIG. 1 (*b*) is selected can be made by pushing the display selection key 12 which serves as the selection means. The state of display shown in FIG. 1 (*b*) is arranged in such a manner that, as an alternative to that in which all of the functions are indicated as shown in FIG. 1 (*a*), the required functions is arranged to be successively displayed in detail through a dialogue. That is, in the initial stage of this display state, the sorter, binding margin, double side, and magnification modes are arranged to be integrated to guide keys 13 indicated as "sorter", "binding margin", "double side", and "magnification" except for the basic functions such as information on the paper feeder and the density. The area below the guide keys 13 are arranged to be a blank portion 14. As a result, in a case where the functions sorter, binding margin, double side, and magnification do not need to be performed, the copying conditions can be determined only with these displays. That is, the operator who is not skilled in this copying machine only needs to determine the size of paper to be supplied and the density of the copy.

If the operator who is not skilled in this copying machine intends to perform copying using the mode of binding margin, the required mode only needs to be selected by using the guide key 13. When this guide key 13 is pushed, the blank portion 14 displays the copying conditions, key to be set, and explanation upon the selected mode.

For example, when the guide key 13 "binding margin" is pushed in the state shown in FIG. 1 (*b*), the contour pattern 11 is displayed in the key portion corresponding to the "binding margin", the factors needed to determine this binding margin mode and so on, that is, the explanation upon the operation procedure, key to select the right side or reverse side on which the binding is performed, key for enlarging or reducing the size, size, and the image preview if the copying is performed are displayed in the blank portion 14 as the individual guidance 15. The operator may perform the setting operation for performing the binding margin mode in accordance with the display in the individual guidance 15. In this case, any expressions are not displayed upon the mode which is not performed, but only the required mode is in detail displayed. Therefore, the operator who is not skilled in this copying machine can decrease the number of errors at the time of setting the mode because of easiness at handling this copying machine. A similar effect can be obtained not only in the case of the binding margin mode, but also in the case in which the other mode is selected.

The fact whether the mode which is now selected is either the state shown in FIG. 1 (*a*) or that shown in FIG. 1 (*b*) depends upon the operation or the like of the display selection key 12. In accordance with the program stored in the ROM 3 or information stored in the non-volatile memory 5, it is controlled by the μCPU 1. As a result, its display state and the relationship between the display means 9 and the setting means 10 are secured.

The touch panel will be described with reference to FIGS. 3 and 4.

Figure 3:
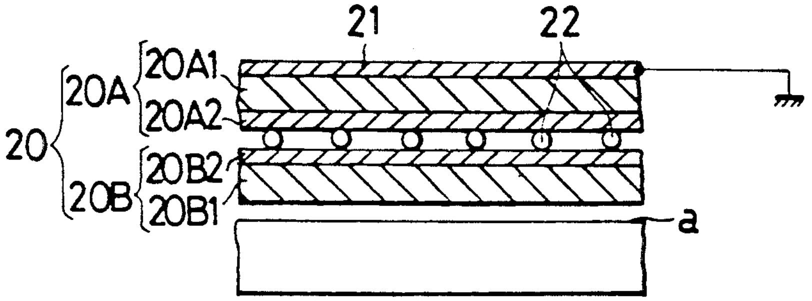
FIG. 3 is a cross-sectional view illustrating a touch panel.
Figure 6:
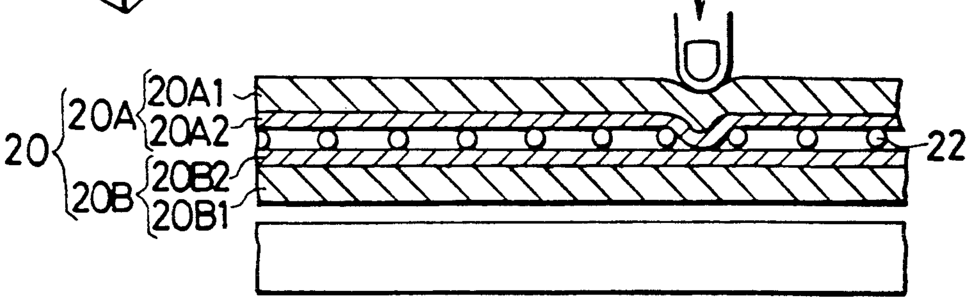
FIG. 6 is a cross-sectional view taken along line IV—IV in FIG. 5.
Figure 7:
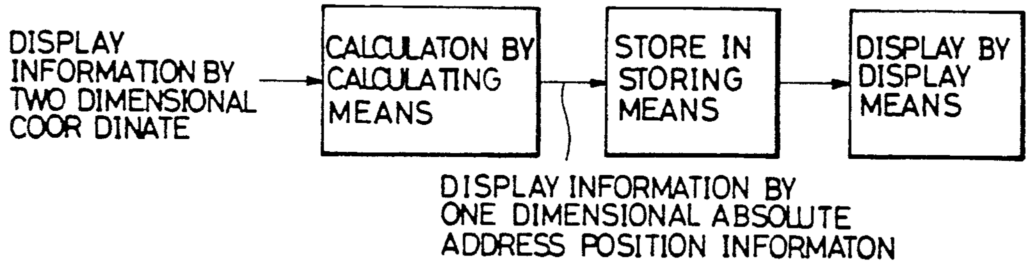
FIG. 7 is a flow chart illustrating a method of controlling a display according to the present invention.

FIG. 3 is a cross sectional view of a touch panel corresponding to that shown in FIG. 6. The same components as those shown in FIG. 6 are given the same reference numerals.

Referring to FIG. 3, a touch panel 20 comprises a portion 20A to be pressed and a support portion 20B which are disposed away from each other by a glass beads or a wire made of an insulating material similarly to that shown in FIG. 6.

Figure 5:
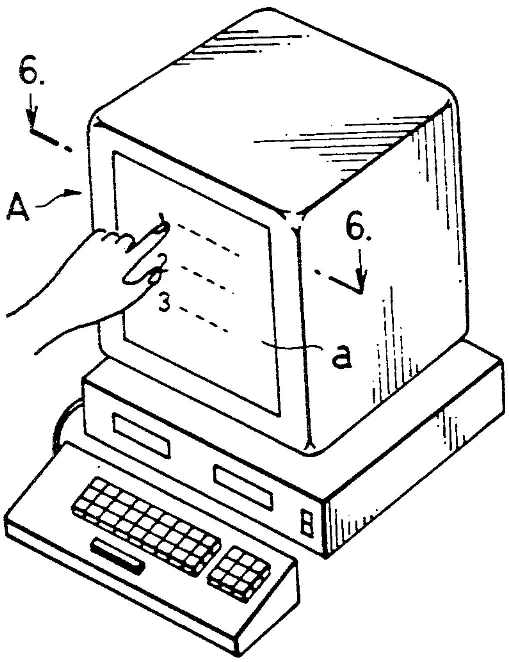
FIG. 5 is a perspective view illustrating an example of a device in which the touch panel is used.

The above-described portion 20A to be pressed comprises: a flexible layer 20A1 made of a transparent resin; and an electrode layer 20A2 which is layered on the surface of this flexible layer 20A1 opposing the surface which confronts the finger (see FIG. 5) of an operator. The support portion 20B comprises a substrate layer 20B1 made of transparent glass or the like and an electrode layer 20B2 layered on the surface confronting the electrode layer 20A2 of the portion 20A to be pressed.

A transparent conductive layer 21 is joined on to the surface of the flexible layer 20A1 of the above-described portion 20A to be pressed which confronts the finger (see FIG. 5) of the operator. This conductive layer 21 is made ground via the electricity passage.

Since this touch panel is structured as described above, when an charged body is brought into contact with the touch panel 20, a static electricity from the charged body is made ground via the conductive layer 21. Therefore, the static electricity is prevented from being discharged in the electrode layer.

Next, an example of modification of an essential portion of the touch panel will be described with reference to FIG. 4.

Figure 4:
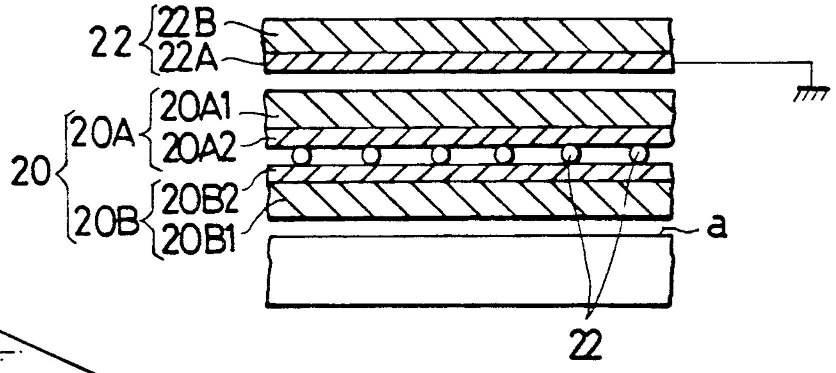
FIG. 4 is a cross-sectional view illustrating a modified example of an essential portion of the touch panel shown in FIG. 3 and corresponding to FIG. 3.

The modified example shown in FIG. 4 is structured in such a manner that a charge releasing portion 22 is formed in the portion 20A to be pressed of the touch panel 20 by: an electrode layer 22A disposed at the position confronting the surface of this portion 20A to be pressed; and a flexible material 22B made of an insulating transparent material joined to the surface of the side with which the finger (see FIG. 5) of the operator is brought into contact. In this modified example, by pressing the charge releasing portion 22, the flexible layer 20A1 in the portion 20A to be pressed of the touch panel 20 is deformed, causing switching to be performed similarly to the case shown in FIG. 3. Therefore, in the conductive layer 22A in this charge releasing portion 22, since the flexible layer 22B serves as the protection layer, the durability at the time of contact action can be improved.

The present invention is structured by: a device having two dot dimensional displaying means having at least two: red and green display layers and capable of displaying at least four colors: red, green, white, and black by combining these indicating layers, this device being characterized by that:

a storing means having a memory space corresponding to the display of the dot displaying means is provided and in which addresses are successively assigned, display information upon the one-dimensional absolute address position information is calculated from display information in which the coordinate information, is as shown in FIG. 1, made as the two-dimensional coordinate information by a calculating means;

the thus-calculated result is stored in the storing means; and the display information is supplied from this storing means to the display means, whereby display can be realized.

The display information in which the coordinate information is made the two-dimensional coordinate information may be arranged to be a macro in which the area thereof is colored with a color selected from a group consisted by red, green, white, and black. Then, according to this macro, the contents in the storing means which corresponds to the information in the area in which the two-dimensional coordinate information items are arranged to be of diagonal each other is rewritten into data of the above-described one color selected from the group constituted by red, green, white, and black by the calculating means. Next, information in this area is erased from the display means as to realize the display using one color selected from the above-described colors.

Furthermore, a structure may be employed that the display information in which the coordinate information is made the two-dimensional coordinate information is arranged to be a macro in which data which has been previously registered by two-dimensional coordinate information is displayed by two colors selected from a group consisting of red, green, white, and black, this macro causing the data to be subjected to an edition by the calculating means in such a manner that the two-dimensional coordinate information is made a start point, and causing the same to be then stored in the storing means for the purpose of displaying it by the display means.

In addition, a structure may be employed that the display information in which the coordinate information is made the two dimensional coordinate information is arranged to be a macro in which data which has been previously registered by a two-dimensional coordinate information items is displayed by three or all of the four colors: red, green, white, and black. Then, in accordance with this macro, the data is stored in the storing means b the calculating means in such a manner that the two dimensional coordinate information is made the starting point for the purpose of causing the display means to perform the display.

An embodiment of the present invention will be described with reference to the drawings.

Figure 8:
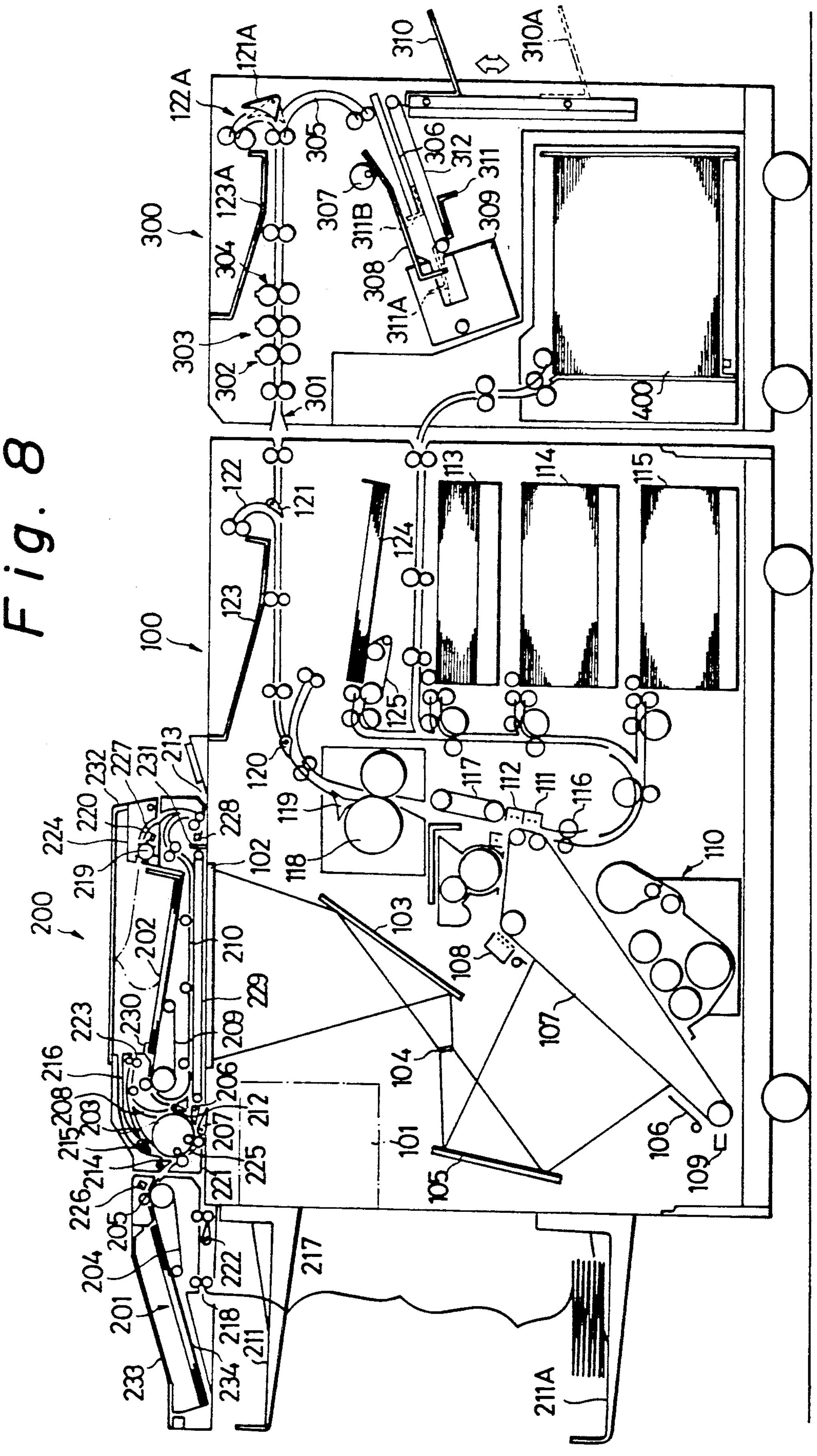
FIG. 8 is a cross-sectional view illustrating an embodiment of a copying machine in which a method of controlling a device according to the present invention is embodied.

FIG. 8 illustrates an example of a copying machine in which the present invention is embodied.

This copying machine comprises a main body 100, a recycle type automatic document feeder (RDF) 200, and a finisher (a device for binding each set) 300.

The main body 100 is provided with a flash exposure lamp and a power source 101 so that the document on a document tray 102 made of contact glass is applied with light from the flash exposure lamp. The light reflected is, via a first mirror 103, a through lens 103, and a second mirror 105, exposed upon a photosensitive body 107. In this case, a guide member 106 restricts the light from the second mirror 105 to the photosensitive body 107 as to prevent the photosensitive body 107 from an excessive exposure. The photosensitive body 107 is rotated by a motor, and is uniformly charged by a charging corona discharger 108 so that a static latent image is then formed due to this exposure. The electricity in the region of the photosensitive body 107 in which the static latent image is not formed is erased by an eraser 109, and the static latent image is developed by a development portion 110 so that it is transferred to a transferring paper by a transferring corona discharger 111. This transfer paper is separated from the photosensitive body 107 by a separating corona discharger 112.

The transfer paper is supplied from any of a first paper supply tray 113, second paper supply tray 114 and a third paper supply tray 115 so that the same is supplied to the position between the photosensitive body 107 and the transferring corona discharger 111 in synchronization with the image on the photosensitive body 107 by a resist roller 116. The transfer paper which has been separated from the photosensitive body 107 is, by a transferring tank 117, and its image is fixed by a fixer 118. This fixer 118 comprises a fixing roller and in which the transfer paper is prevented from being wound to the fixing roller is prevented by a separation claw 119.

The process through which the transfer paper is to be subjected is varied in accordance with the copy mode.

In a case of a mode in which the transfer paper is discharged into the main body tray 123, a double side switching claw 120 is disposed in a position different from the illustrated position and the direction of the transfer paper to be fed is determined so as not to be fed to a double side tray 124. Then, a paper discharging claw 121 is shifted to a position at which the transfer paper is made advance to the main body tray 123 so that the transfer paper is discharged from the fixer 118 to a main body tray 123 via a turning portion 122. In this state, the side of the transfer paper on which the image is present is made lower side, and it is arranged properly in accordance with page sequential order on the main body tray 123.

In a case of a mode in which the transfer paper is discharged to a finisher 300, the paper discharging claw 121 is shifted to a position at which the transfer paper cannot be fed to the turning potion 122 so that the transfer paper is discharged from the fixer 118 to an insertion port 301 of a finisher 300.

In the above-given description, the case in which the transfer paper is discharged from the main body 100 is described. In a case of the mode in which double side copy is performed, the discharge of the transfer paper is performed in the different manner from the above-described case. The transfer paper on which the image has been copied on the surface thereof is outputted from the fixer 118, and its advancing direction is changed by the double side changing claw 120 to the double side tray 124. As a result, the transfer paper is accommodated by the double side tray 124. Therefore, the transfer paper is arranged properly in the double side tray 124 in accordance with the page sequential order in such a manner that the side thereof on which the image has been copied is positioned in the upper portion. The transfer paper which has been accommodated in the double side tray 124 is successively supplied by a double side paper supplying belt 125 starting from the paper disposed in the lower portion. They are then fed by a resist roller 116 similarly to the transfer paper which is fed from the paper supply trays 113 to 115 to the position between the photosensitive body 107 and the transferring corona discharger 111 in synchronization with the image on the photosensitive body 107. Then, the image on the photosensitive body 107 is copied to this transfer paper by the transferring corona discharger 111 on the reverse side thereof. Then, the transfer paper is separated from the photosensitive body 107 by a separating corona discharger 112, and is discharged to he main body tray 123 or the finisher 300 via the transferring tank 117 and the fixer 118.

A recycle type automatic document feeder 200 includes a first document tray 201, a second document tray 202, a document turning portion 225, a successive paper supplying portion 224, and a document paper discharging tray 211, and comprises an ADF mode, an RDF mode, and a successive paper supply mode.

In the ADF mode, the document set in the first document tray 201 is supplied from the lower side by a paper supply belt 204, and is passed through a passage 205. Then, it pushes up a guide claw 214, and passes through passages 225 and 208 so that the same is stacked on the second document tray 202 through a discharge port 223. The document stacked on this second document tray 202 is supplied from the lower side by a paper supply belt 209, and passes through an intermediate passage 210 so that the same is supplied to a predetermined position on the document tray 102 wherein a predetermined number of sheets are copied (exposed) by the main body 100. The document on the document tray 102 is fed to the left by a belt-like transmitting body 229 after it has been copied, passes below ,a branching claw 207, and passes through a passage 221 as to be discharged through a discharge port 217 on to the discharge paper tray 211. In this state, the branching claws 207 and 222 have been turned as to have the document discharged through the paper discharge port 217.

The RDF mode is a mode in which a predetermined number of copying sheet are processed by performing one exposure to one document sheet as to process one set of the copying sheets by repeating this exposure. In this RDF mode, the process until the document which has been set on the first document tray 201 is copied (exposed) as the first time is performed similarly to the process of the above-described ADF mode. The document which has been subjected to the first copying (exposure) is picked up from the document tray 102 by the branching claw 207 as to be supplied to the passage 225. Then, it is introduced into a guide space 216 by the branching claw 215. When the rear end of this document has passed a guide claw 206, a transferring driving source is reversed as to feed the document in such a manner that the rear end of the document is made the front end as to be introduced into the passage 208. Next, it is stacked again on the second document tray 202 through the paper discharge port 223. As a result, the document which has been exposed is again set on the second document tray 202 in the same direction as that before being subjected to the exposure. At this time, since the document which has not been as yet subjected to the exposure and the document which has been exposed are clearly separated by a partition member 230 which is selectably movably disposed, the completion of the one exposure can be acknowledged. By repeating this action by a predetermined number, a predetermined set of copies can be obtained.

In the above-given description, the ADF mode and the RDF mode are described. The operation of copying the double side document having the two sides on which information is respectively present will be described.

In a case where the double side document is processed in the ADF mode, the document set on the second document tray 202 is again stacked on the second document tray 202 by performing an idle feeding. It can be achieved by discharging the document set on the second document tray 202 to the paper discharge port 223 through the document tray 102, and passages 225 and 203 as to again stack it on the second document tray 202. Then, the document is fed to the position at which the exposure is performed through the same route used when the idling feeding is performed. When a predetermined number of exposures have been performed, the document is introduced into a guide space 216 via the passage 225. Then, when the rear end of the document has passed through the guide claw 206, the transferring driving source is reversed so that the rear end of the document is made the front end, and is fed in a reversed manner. This document is made advance through the intermediate passage 210 by the operation of the branching claw 212 so that it is introduced into the document tray 102 again. Then, the reverse side is then exposed by a predetermined times. When this exposure has been completed, the document is discharged onto the discharge tray 211. By performing above-described process of the operation upon all of the documents, the double side copying is completed.

Next, in a case where the double side document is processed in the RDF mode, the document set on the second document tray 202 is sent to the document tray 102 via the passage 210. Then, after it has been exposed once, it is again stacked on the second document tray 202 through the paper discharge port 223 via the passages 225 and 203. At this time, the document is stacked on the second document tray 202 in such a manner that the document is turned out. Next, the document is sent to the position at which the exposure is performed in the same route as described above. Then, after the reverse side has been exposed once, it is discharged onto the second document tray 202 through the same route as described above. As a result, a set of double side copy is processed. That is, by cycling the document twice, a set of double side copy can be processed. The document which has cycled twice and again stacked on the second document tray 202 is set in such a manner that the direction of the document is made the same as that when the document is first set in the second document tray 202. By repeating two cycles by a predetermined number of times, a predetermined number of sets of copy from a double side document to a double side copy can be processed.

By the above-described operation, the ADF mode with which a plurality of copies can be simultaneously obtained from one document and the RDF mode with which a plurality of sets of copies which is arranged to the page sequential order are processed by processing one copy from a document sheet and repeating the setting of the document can be achieved. The former mode: ADF mode is suitably used in a system in which a sorter is connected to the main body 100 as the post-processing device of the copy, while the latter mode: RDF mode is suitably used in a system in which a finisher is connected to the main body 100 as the post processing device of the copy. This embodiment corresponds to the case in which the finisher 300 is connected to the main body 100.

Then, a multijob mode in the document process will be described.

This mode is a mode arranged in such a manner that, even if a copying work is performed, a plurality of sets of documents to be subjected to the ensuing work can be previously set to the other paper supply tray. As a result, when one job is completed, the ensuing jobs are successively performed in accordance with each of the contents of the job for the purpose of performing a predetermined copying work. Therefore, the major object of this mode is to delete the waiting time during the copying work.

In this mode, when a set of document is set on the first document tray 201, a data sheet 234 for inputting the copying conditions is set in the direction through which the paper supply is performed (in this case, the lower side paper supply is performed, therefore, on the lowermost side). When a plurality of documents sets are positioned on the first document tray 201, the data sheet is each set in the lowermost portion of the set in the above-described manner. The supply of the document starts in response to a paper supply start signal. First, the data sheet is supplied and the copying conditions are read by a sensor group 226 from this data sheet. According to the thus-read copying conditions, the states of the copying machines are determined, and the space in the second document tray 202 is determined to the size of the document. Then, the data sheet 234 passes though the document tray 102 via the passages 225 and 210, and is discharged on to the paper discharge tray 211 through the paper discharge ports 217 and 218 via the passage 221. The document following the data sheet is discharged and stacked on the second document tray 202 through the paper discharge port 223 via the passages 225 and 208 so that a preparation for the ADF mode or the RDF mode is performed. Next, as described above, the document on the second document tray 202 is copied and the next job is prepared after all of the document has been discharged on to the paper discharge tray 221 upon the completion of the copying work. In this case, the end of the set of the document to be supplied from the first document tray 202 is detected by a fact that the sensor detects the next data sheet is supplied. This next data sheet is arranged to be stopped in the first document device 233 until the preparation for the next job will be completed.

Next, a mode of copying a continuous paper sheet (such as computer output sheet or the like) will be described.

A continuous and folded paper sheet is set on the second document tray 202 and is positioned by using an end plate and a side plate. As a result, the length of the one folding unit of the paper sheet can be read, and the number of feeding perforations can be detected. The number of the perforations which has been detected becomes the guide of a page of the paper sheet to be fed next. The upper end of the paper sheet is set to a sprocket 219 so that the paper sheet is introduced into the document tray 102 through the passage 220. At this time, the front end of the paper sheet is detected by a sensor 228 so that the paper sheet is fed by a predetermined length in accordance with the relationship between the position of this front end, the guide of the document, and the number of the perforations. As a result, the paper sheet is stopped at a predetermined position on the document tray 102 so that the same is copied by the main body 100. Then, the paper sheet is, by every pages, set by the sprocket 219, and copying it can be performed. The paper sheet which has been copied is discharged through the paper discharge port 218 via the passage 221, and is stacked on the paper discharge tray 211A with the same folded. In order to select a mode of idle-feeding the paper sheet by every pages or a mode of continuous paper sheet feeding, a selection button is provided.

In the finisher 300, the transfer paper which has been discharged from the main body 100 and passed through the insertion port 301 is punched out by a B4-punching roller 302, A4-punching roller 303, A3-punching roller 304. This punching-out operation is performed by the rotation of the B4-punching roller 302, A4-punching roller 303, A3-punching roller 304 in accordance with the pass of the transfer paper. The position at which this punching is performed is different in accordance with the size of the transfer paper. In a case of the B4 transfer paper, the transfer paper is twice punched out by the B4-punching roller 302, in a case of the A4 transfer paper and B5 transfer paper, the A4-punching roller 303 is used to punch out the transfer paper once. In a case of the A3 transfer paper, punching is performed twice by the A3-punching roller 304. The thus-punched transfer paper is, by the turn portion 305 arranged properly in accordance with its page sequential order from the bottom in the staple tray 306, and is bound by a stapler 309. The thus-bound transfer paper is fed out from the machine by a claw 311 secured to the belt 312, and is discharged on a paper discharge tray 310 disposed to be able to move vertically. In a case where hole forming is performed without binding the transfer paper, the transfer paper is discharged on an upper paper discharge tray 123A after it has passed the guide 112A by the claw 121A. The above-described punching device punches the transfer paper sheets one by one. If a method is employed in which punching is performed simultaneously or after binding has been performed, a problem of runout of the holes generated after the binding can be overcome.

Figure 27:
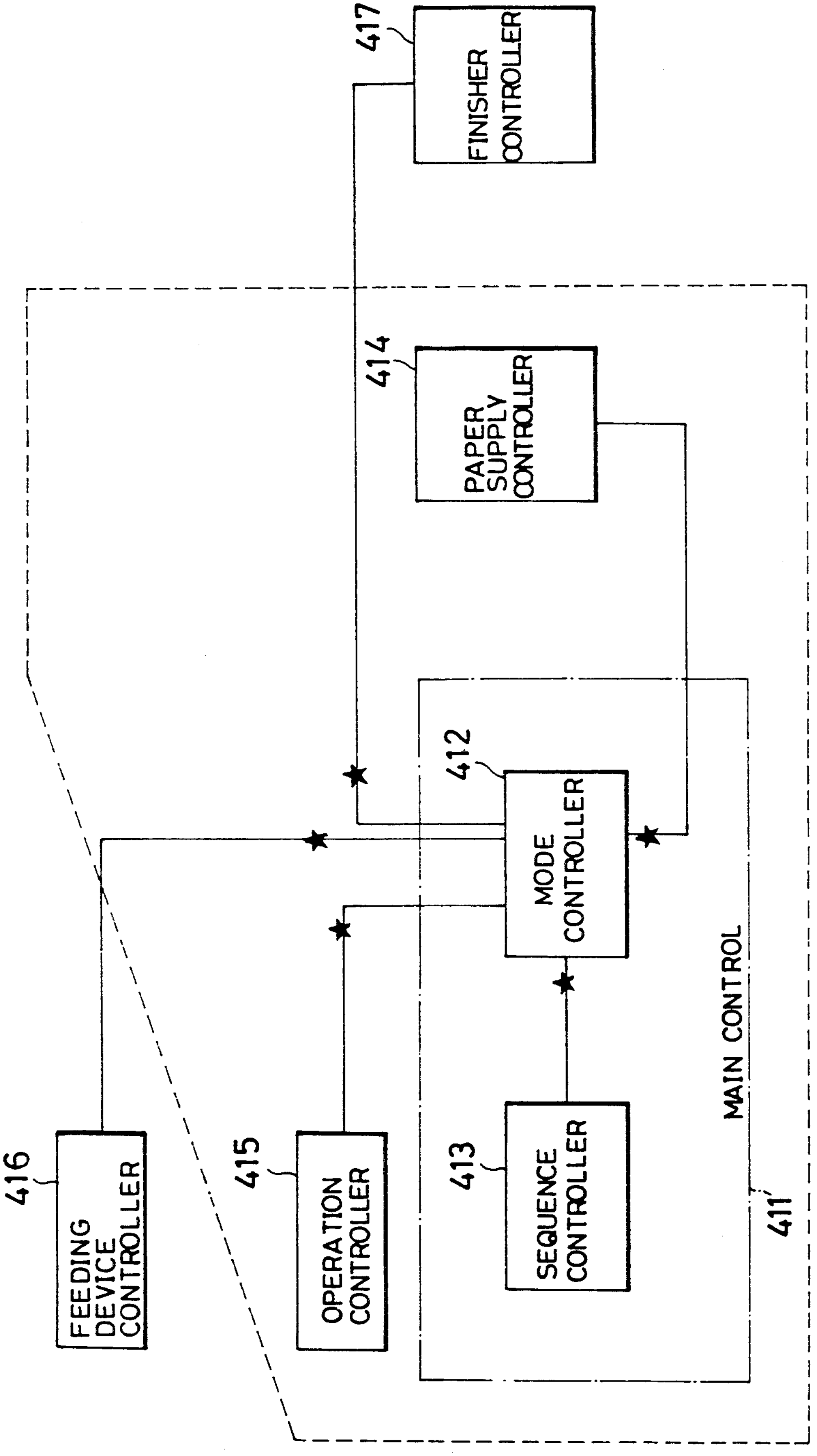
FIG. 27 is a view illustrating a block diagram showing the structure of a circuit used in the copying machine.

FIG. 27 illustrates a circuit for the copying machine. Reference numeral 411 represents a main control portion which comprises two microprocessors: a mode controller 412 and a sequence controller 413, and acts to have each portions controlled by each of controllers (microprocessors) 414 to 417. The paper supply controller 414 controls the paper supply portion, while the operation controller controls the switch and display portion. The automatic document feeding device controller 416 controls the automatic document feeding device 200, while the finisher controller 417 controls the finisher 300.

Figure 28:
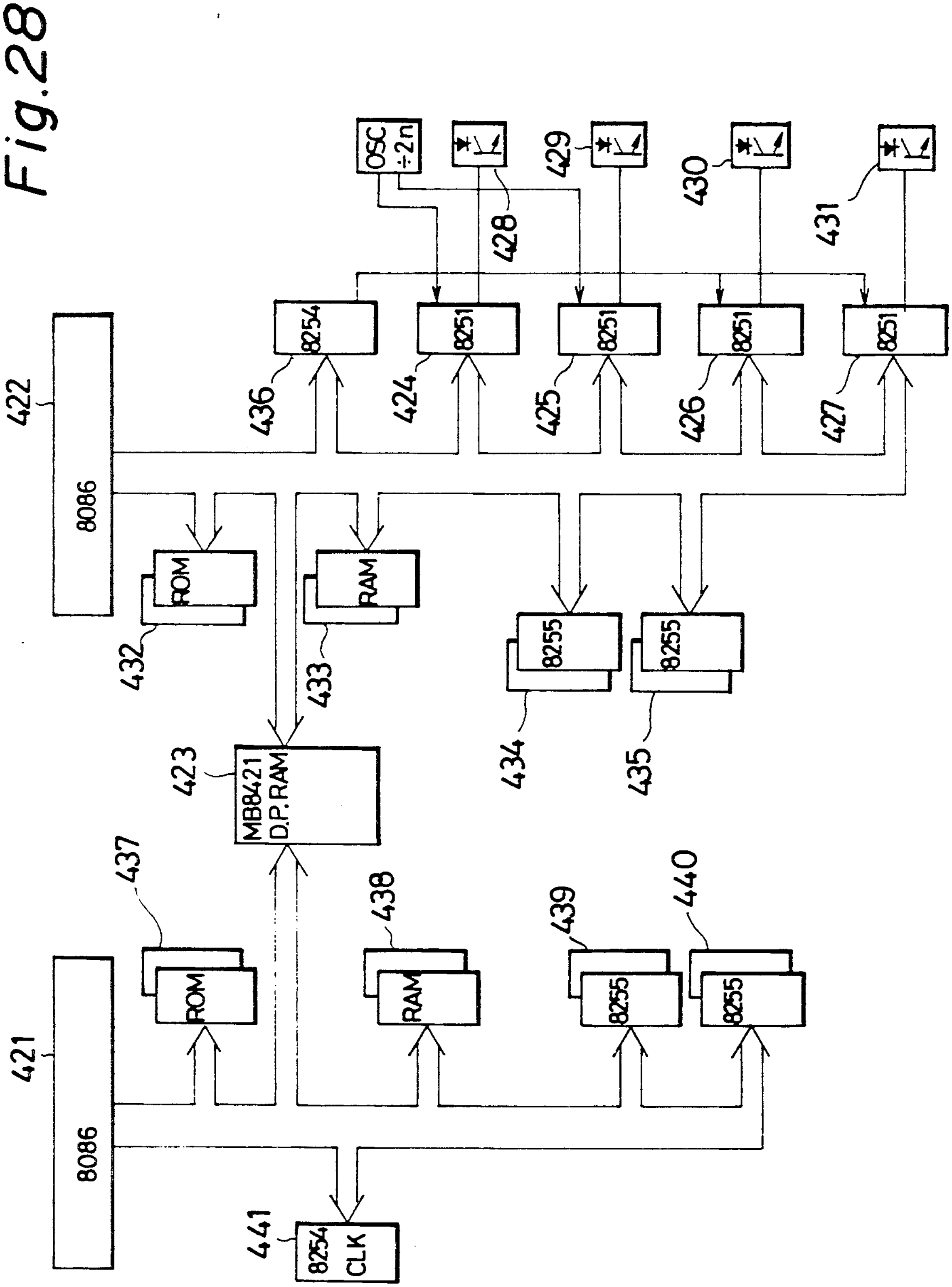
FIG. 28 is a view illustrating a block diagram showing a major control portion of the copying machine.

FIG. 28 illustrates the structure of the main control portion 411.

This main control portion 411 includes two microprocessor 421 and 422, and each of which using the microprocessor 8086. This microprocessor 421 in main performs the sequence control of this copying machine, while the microprocessor 422 is a mode controlling microprocessor which collectively controls, in addition to the sequence control microprocessor 421, the paper supply controller 414, operation controller 415, automatic paper feeding device controller 416, and the finisher controller 417.

The mode controlling microprocessor 422 establishes a communication with the sequence controlling microprocessor 421 with a RAM 423, and the same establishes a communication with the other controllers 414 to 417 with each of the serial controllers 424 to 427 through optical fibers 427 to 431. Furthermore, a ROM 432, RAM 433, input and output ports 434 and 435, and a timer 436 are connected to the mode controlling microprocessor 422.

On the other hand, a ROM 437, RAM 438, input and output ports 439 and 440, and a timer 441 are similarly connected to the sequence controlling microprocessor 421.

Figure 29:
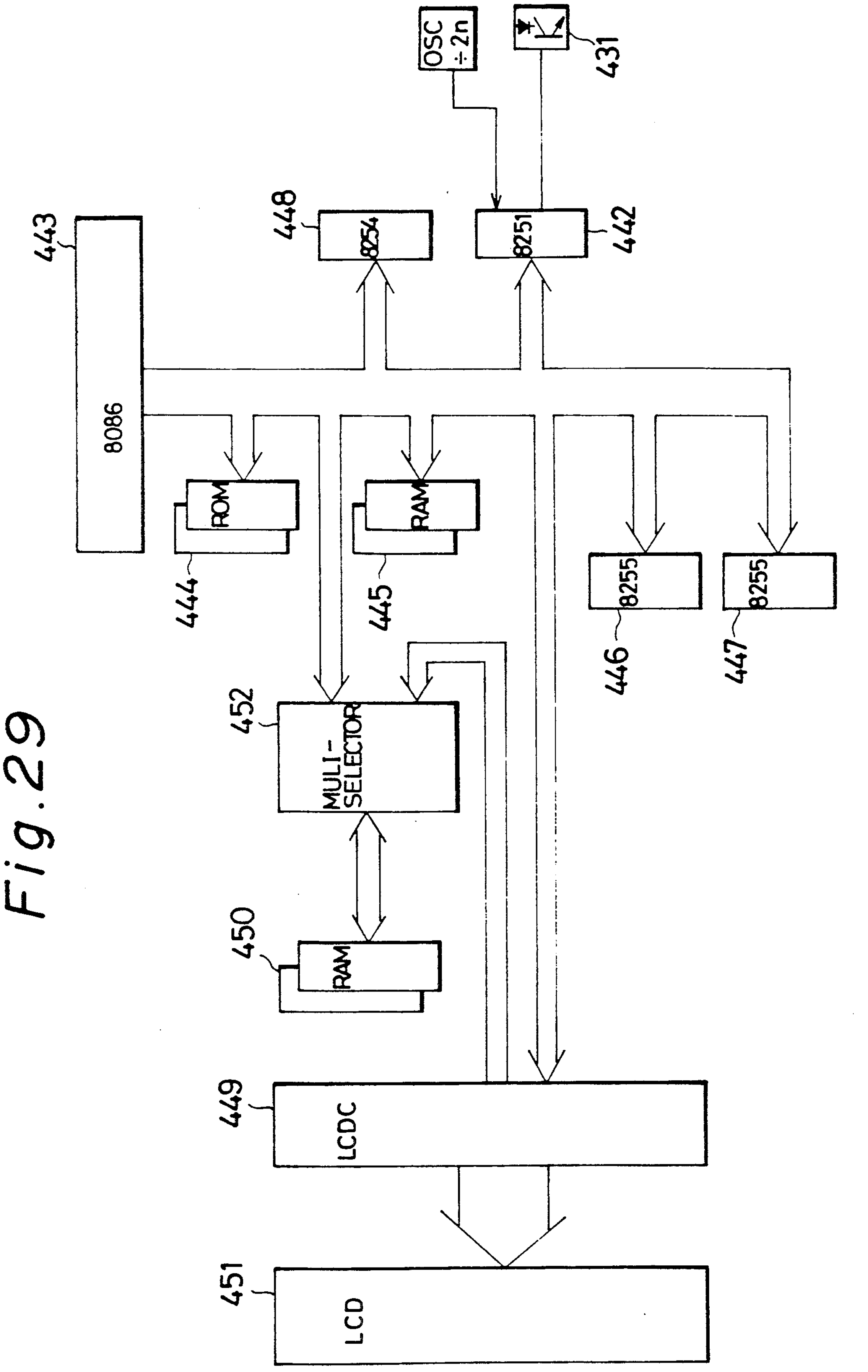
FIG. 29 is a view illustrating a block diagram showing a switch control portion of the copying machine.

FIG. 29 illustrates the structure of the operation controlling microprocessor establishing a communication with the mode controlling microprocessor 422 through the optical fiber 431 and the serial controller 442. This operation controlling microprocessor 415 acts to collectively control the switch and display portion. A ROM 444, RAM 445, input and output ports 446 and 447, timer 448 and a display controller 449 are connected to this operation controlling microprocessor 443. A display controller memory 450 comprising a RAM includes a memory space which corresponds to the display formed by the display means 451, and stores data to be displayed by this display means 451. This display controller memory 450 is connected, by a multiselector 452, to the operation controlling microprocessor 443, display controller 449. That is, when display data is written in the display controller memory 450, the display controller memory 450 is connected to the operation controlling microprocessor 43, while when the display data is output to the display means 451, the display controller memory 450 is connected to the display controller 449. The display controller 449 has the display means 451 displayed a colored graphic by display data which has been stored in the display controller memory 450.

Figure 9:
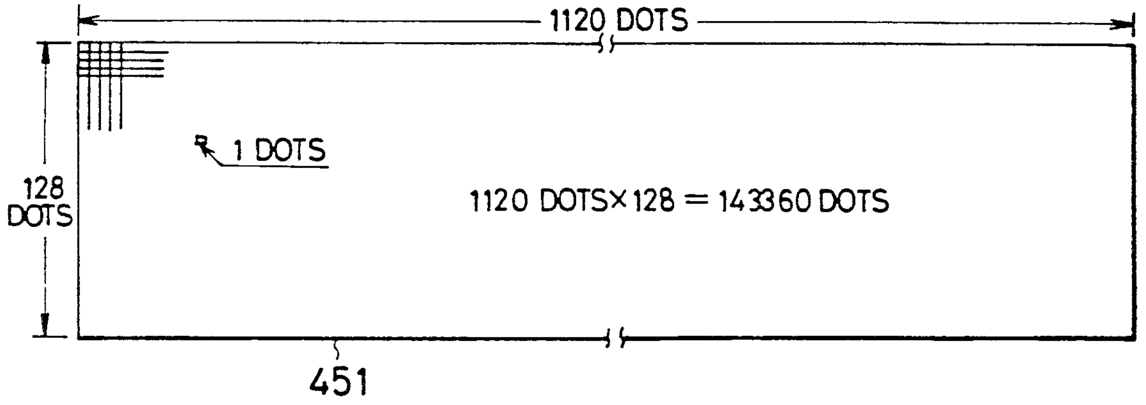
FIG. 9 is a view illustrating an arrangement of dots used in a dot displaying means in the copying machine.

FIG. 9 illustrates the dot structure of a dot display means 451 of the switch and the display portion of this copying machine. This dot display means 451 comprises a liquid crystal display of 143, 360 dots formed by 1120 dots in the transverse direction, and 128 dots in the lengthwise direction so that a graphic or color can be displayed by turning on or off optional dots selected from 143, 360 dots.

Figure 10:
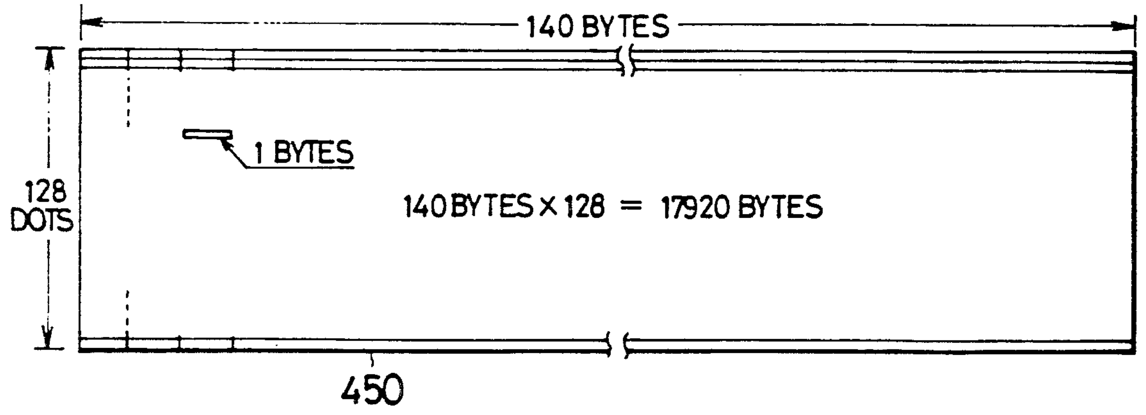
FIG. 10 is a view illustrating a display controller memory of the copying machine.

FIG. 10 illustrates the structure in the display controller memory 450 which stores data to be displayed by the dot display means 451 in such a manner that each 8 dots serving as a byte is assigned in the transverse direction. This display controller memory 450 is formed by a memory of 17, 920 bytes constituted by 140 bytes in the transverse direction and 128 dots in the lengthwise direction in accordance with the dot display means 451.

Figure 11:
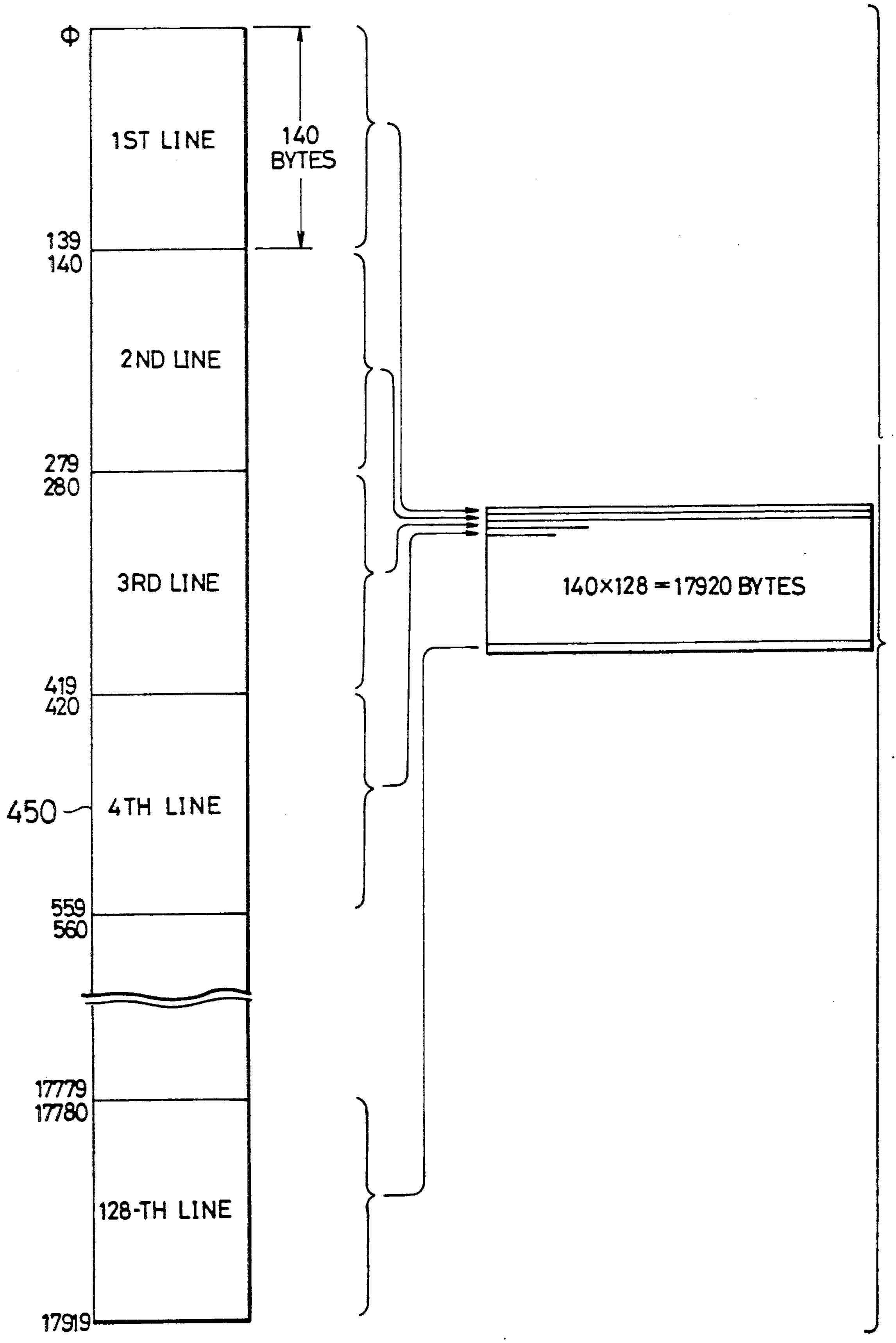
FIG. 11 is a view illustrating an actual arrangement of the display controller memory.

FIG. 11 illustrates the specific arrangement of the display controller memory 450. The display of the dot display means 451 performs a two-dimensional display in the lengthwise direction and the transverse direction. However, the display controller memory 450 uses, as display controller memory 450 is formed by 140 bytes, and is further structured by 8 bits in which one byte corresponds to 8 dots. The second lines to the 128-th liens are similarly structured.

Figure 12:
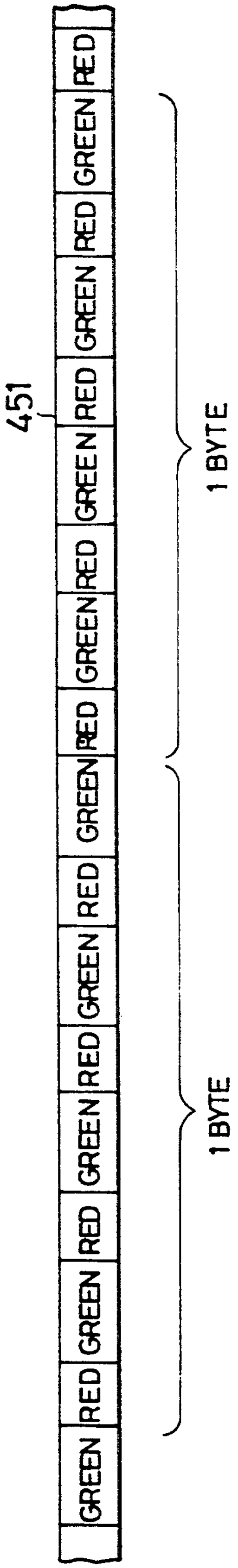
FIG. 12 is an enlarged view illustrating a part of the dot displaying means.

FIG. 12 illustrates in an enlarged manner a part of the dot display means 451. The dot display means 451 is structured in such a manner that one byte is formed by 8 dots and each 4 bits of red dots and 4 bits of green dots are alternately arranged.

Figure 13A:
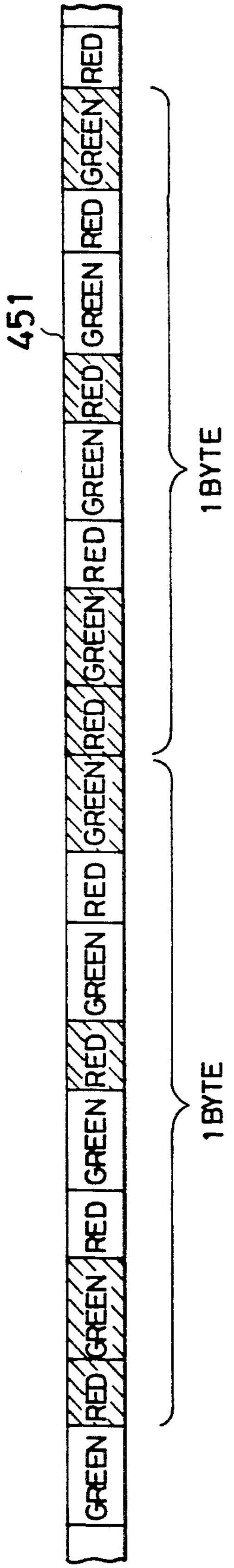
FIGS. 13(*a*) and 13(*b*) are a view illustrating the color expression by the dot displaying means.
Figure 13B:
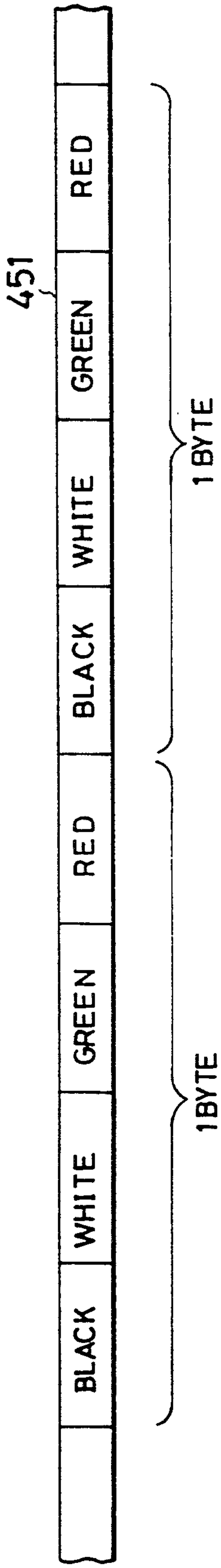

FIG. 13 illustrates the manner of color display by using the red and green dot arrangement in the dot display means 45. The color displayed by the dot display means 451 is displayed by combination of two dots: one red dot and one green dot. Therefore, the description will be made assuming that 2 bytes 16 dots form a set. Referring to FIG. 13 (*a*), the dots with oblique line are turned off, while the same without the oblique line are turned ON so that the color display shown in FIG. 13 (*b*) is realized. As can be clearly seen from this, the color display by turning on/off the combination of two dots formed by one red and one green dot becomes as shown in Table 1.

| Red dot | Green dot | Color |
|---|---|---|
| OFF | OFF | Black |
| OFF | ON | Green |
| ON | OFF | Red |
| ON | ON | White |

Figure 14:
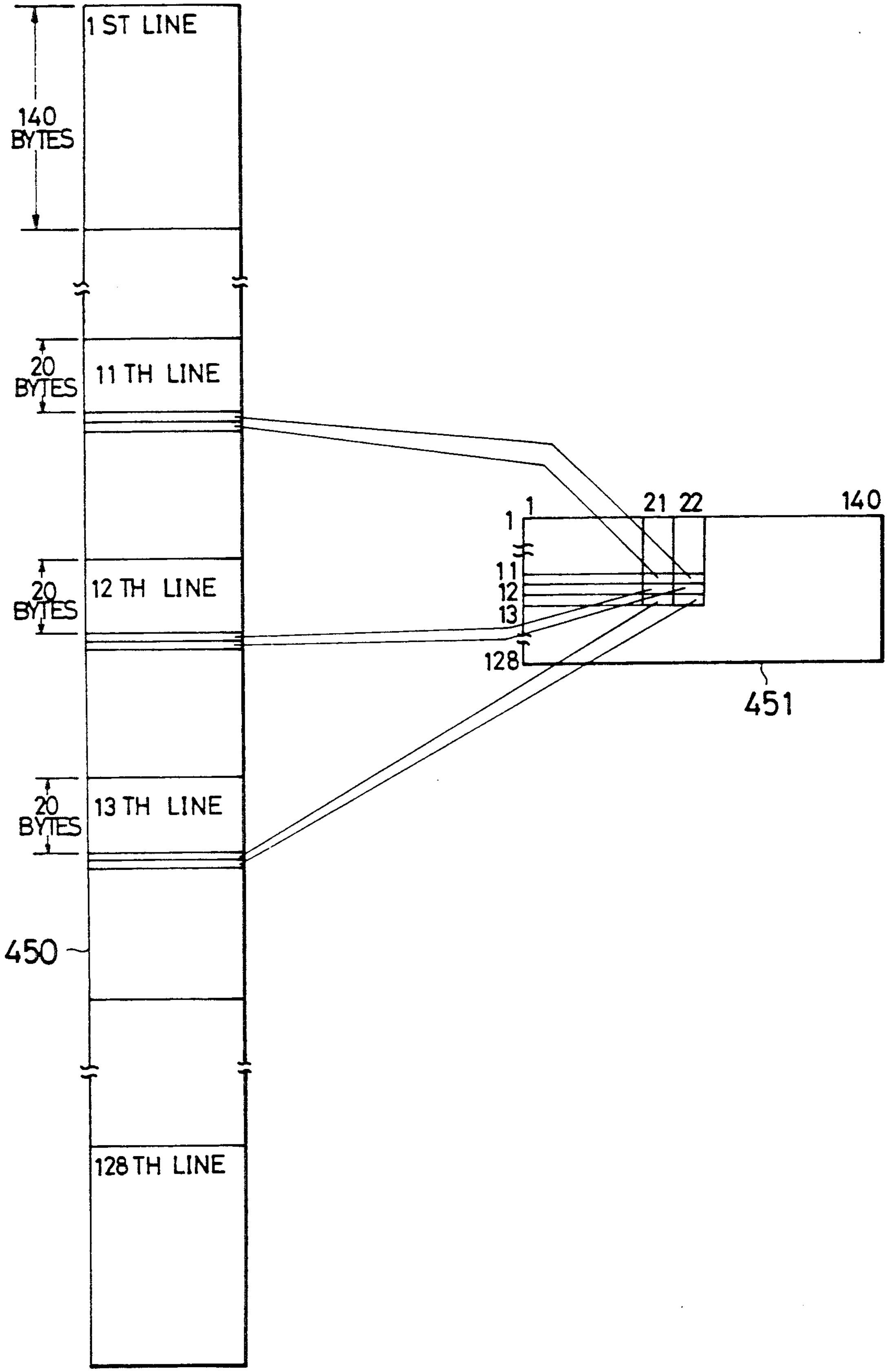
FIG. 14 is a view illustrating the relationship between the dot displaying means and the display controller memory.

FIG. 14 illustrates the correspondence between the two-dimensional display realized by the dot display means 451 and the address in the display controller memory 450. As can be clearly seen from this drawing, the address calculation for developing the graphic data to the display controller memory 450 is extremely complicated.

Figure 15A:
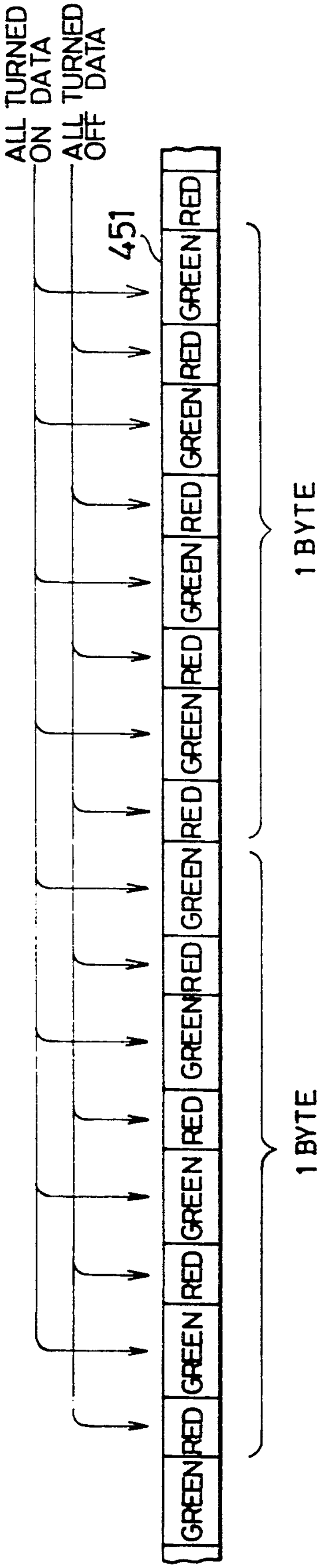
FIGS. 15(*a*) and 15(*b*) are a view illustrating the portion of the copying machine in which embodiment of the present invention is embodied.
Figure 15B:
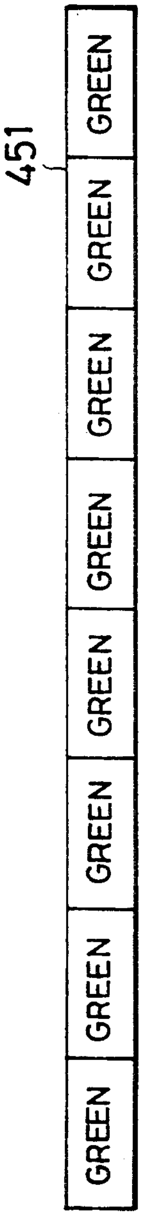

FIG. 15 illustrates the portion of this copying machine in which another embodiment is embodied. In the dot display means 451, when all of the green dots of the 2 bytes formed by 16 dots in all constituted by each 8 dots of red and the same of green are turned on and all of the red dots are turned off as shown in FIG. 15(*a*) obtained. By widening the thus-obtained green display to the region shown in FIG. 14, the entire area in which two two-dimensional coordinates are made diagonal each other can be colored green so that the color displays as shown in Table 2 can be obtained by combining the all of green dots are turned on/the same are turned off and all of red dots are turned on/the same are turned off.

| Red dot | Green dot | Color |
|---|---|---|
| All are turned off | All are turned off | Black |
| All are turned off | All are turned on | Green |
| All are turned on | All are turned off | Red |
| All are turned on | All are turned on | White |

Figure 16:
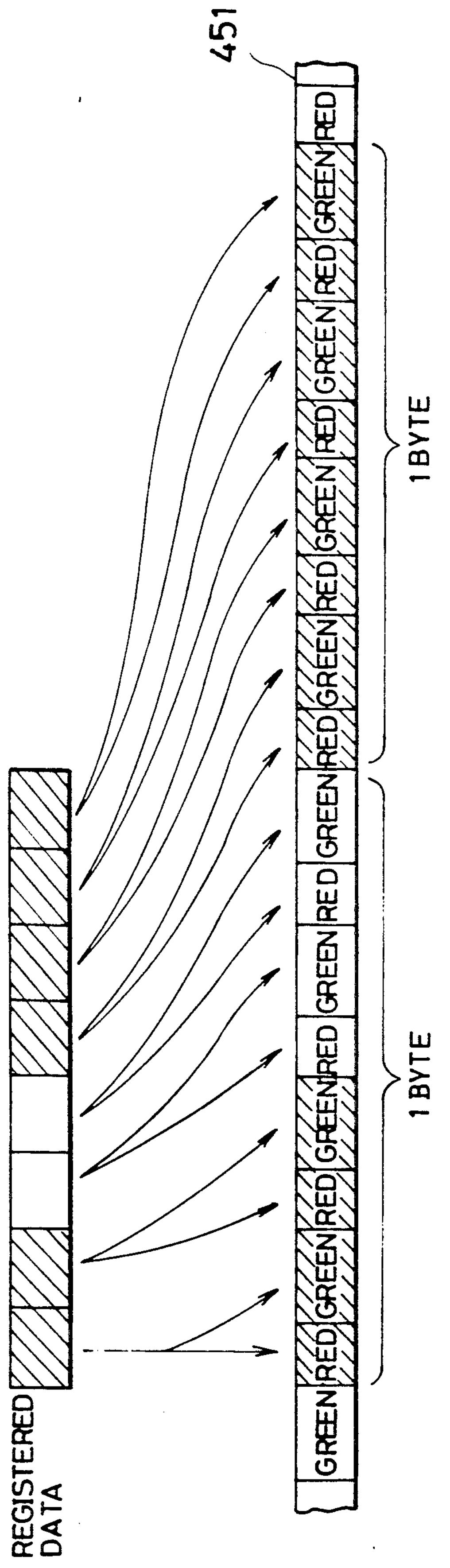
FIGS. 16(*a*), 16(*b*), 17(*a*), 17(*b*), 18(*a*), 19(*a*), and 19(*b*) are views illustrating the portion of the copying machine in which the other modified examples are embodied.
Figure 16:
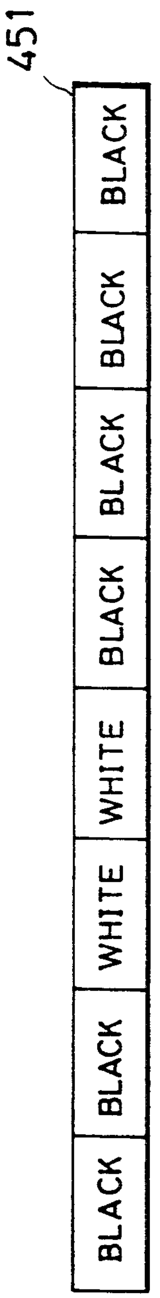

FIGS. 16 to 19 illustrate the portion of this copying machine in which the other embodiment of this copying machine is embodied. FIG. 16 illustrates an example in the dot display means 451 in which a previously stored data constituted by two bytes formed by 8 bits of red and the same of green is similarly stored in the display controller memory 450. By turning off/on each red and green dots in the dot display means 451 by using the dots with the oblique line shown in FIG. 16 (*a*) in the display controller memory 450 as data on turning off, a graphic formed by white on black base as shown in FIG. 16 (*b*) can be obtained, wherein each of red and green dots is arranged in such a manner that the dots with the oblique line in FIG. 16 (*a*) are turned off, while the same without the oblique line is turned on. The description will be made similarly hereinafter.

Figure 17A:
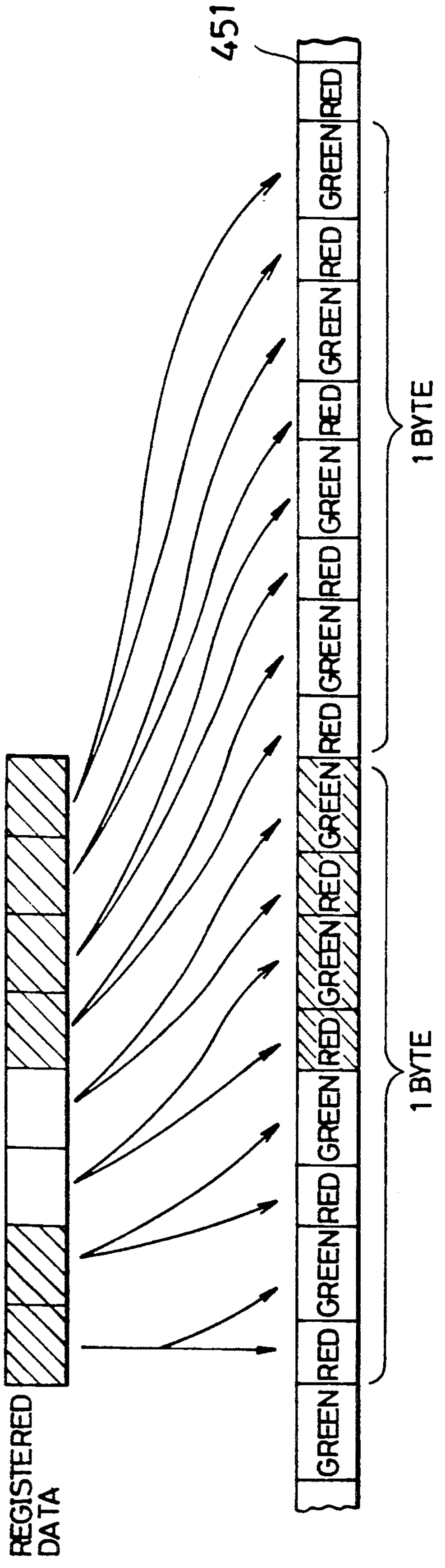
Figure 17B:
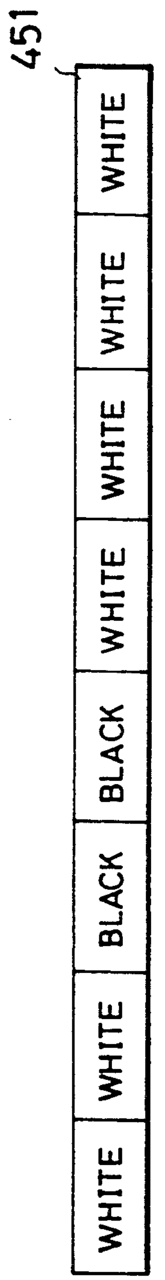

Similarly, FIG. 17 illustrates an example in the dot display means 451 in which a previously stored data constituted by two bytes formed by 8 bits of red and the same of green is stored in the display controller memory 450 in such a manner that each of the 8 green and red dots are turned and then stored in the display controller memory 450. As a result of which, a graphic formed by white on a black base can be obtained. Referring to this drawing, the bold line represents the turn o the data.

Figure 18A:
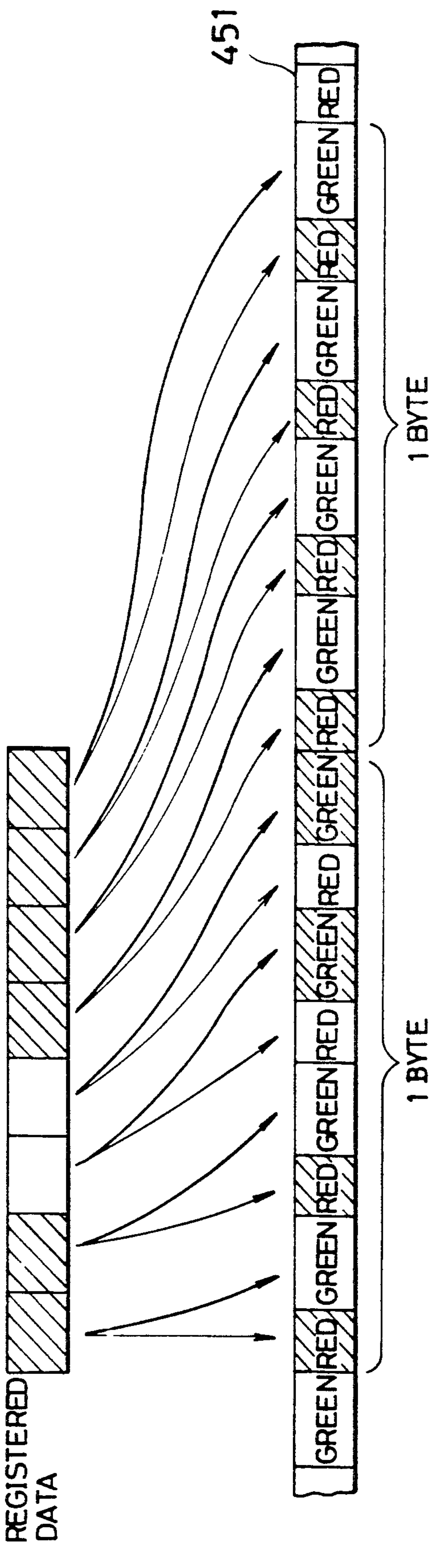
Figure 18B:
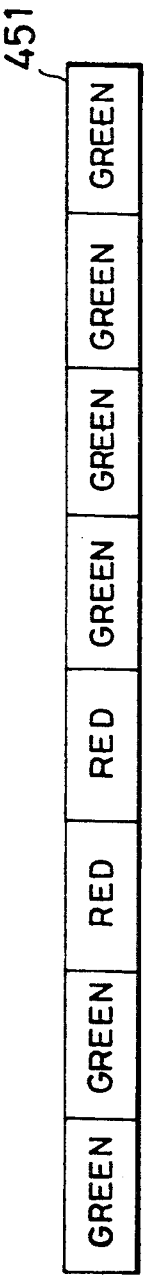

FIG. 18 illustrates an example in the dot display means 451 in which a previously stored data constituted by two bytes formed by 8 bits of red and the same of green is stored in the display controller memory 450 in such a manner that the 8 green dots are turned, while the 8 red dots are not turned, that is, as it is, stored in it. As a result, a graphic formed by green base and red can be obtained.

Figure 19A:
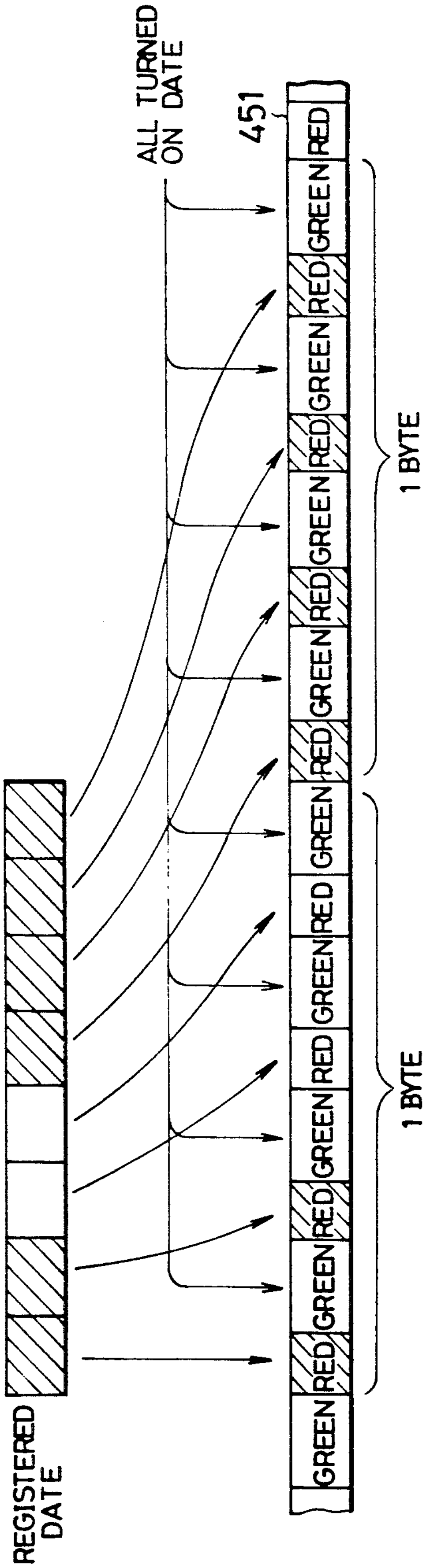
Figure 19B:
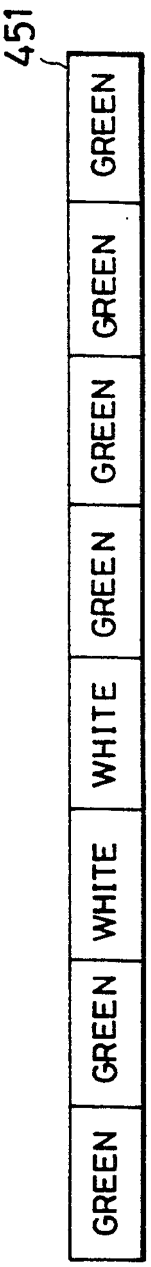

FIG. 19 illustrates an example in the dot display means 451 in which a previously stored data constituted by two bytes formed by 8 bits of red and the same of green is stored in the display controller memory 450 in such a manner that data of 8 red dots which has been previously stored is stored in the display controller memory 450, while, data representing all are turned on of the 8 green dots are stored in the display control memory 450 regardless of the data which has been previously stored. As a result, a graphic formed by white on a green base can be obtained.

The following table 3 illustrates the relationship of the two bytes formed by 8 bits of red dots and the same of green dots in the dot display means 451 between data to be stored in the display controller memory 450 and displayed graphics.

| Red dot | Green dot | Color |
|---|---|---|
| Registered data | Registered data | White on black base |
| Registered data | Turned registered data | Red on green base |
| Turned registered data | Registered data | Green on red base |
| Turned registered data | Turned registered data | Black on white base |
| Registered data | Data on all are turned on | White on green base |
| Registered data | Data on all are turned off | Red on black base |
| Turned registered data | Data on all are turned on | Green on white base |
| Turned registered data | Data on all are turned off | Black on red base |
| Data on all are turned on | Registered data | White on red base |
| Data on all are turned on | Turned registered data | Red on white base |
| Data on all are turned off | Registered data | Green on black base |
| Data on all are turned off | Turned registered data | Black on green base |

As described above, a graphic can be displayed on the dot display means 451 by using two colors selected from red, green, white and black with mono data which has been previously registered.

Figure 20A:
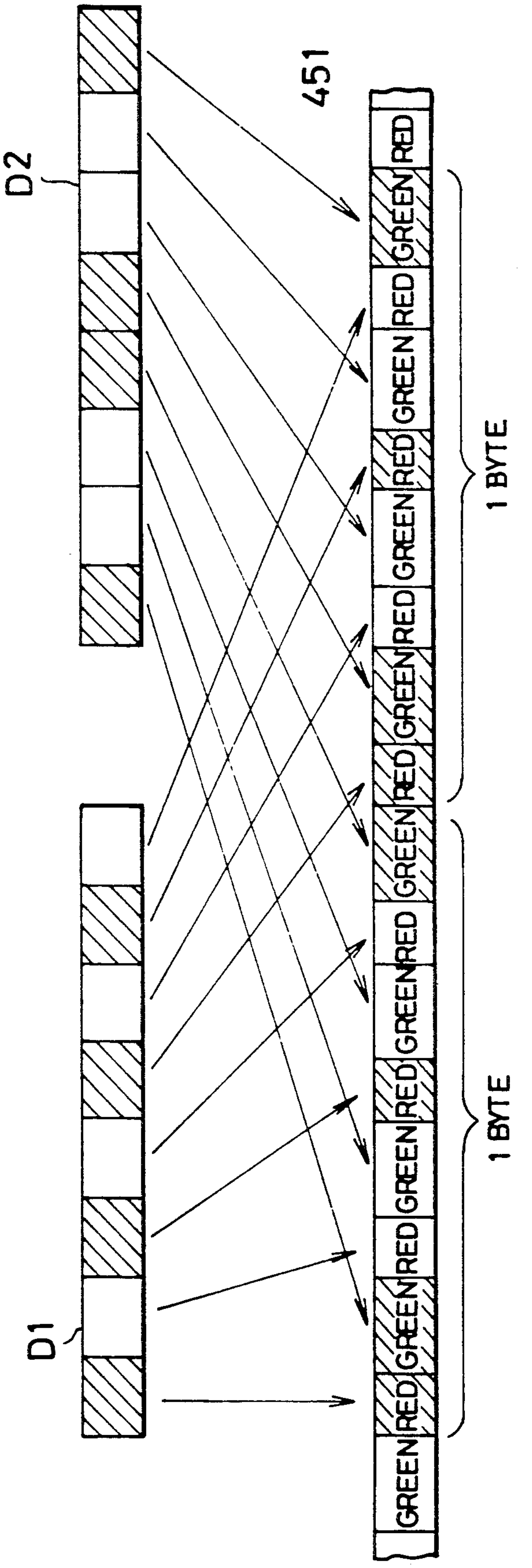
FIGS. 20(*a*) and 20(*b*) are a view illustrating the portion of the copying machine in which a still further modified example is embodied.
Figure 20B:
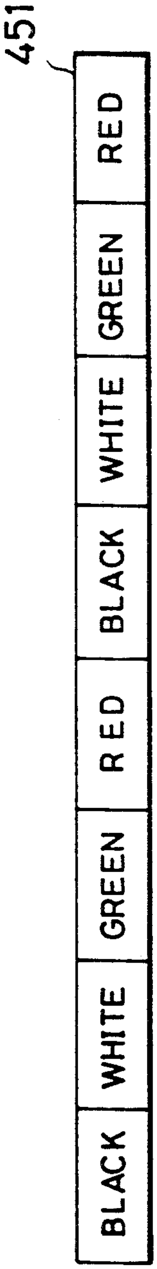

FIG. 20 Illustrates the portion in which a still further modified example of this copying machine is embodied. In this case, a graphic can be displayed with the dot display means 451 by storing two sets of data D1 and D2 which have been registered as data formed by 8 red dots and 8 green dots in the display controller memory 450.

Next, data for making the dot display means 451 draw a graphic will be described.

Figure 21:
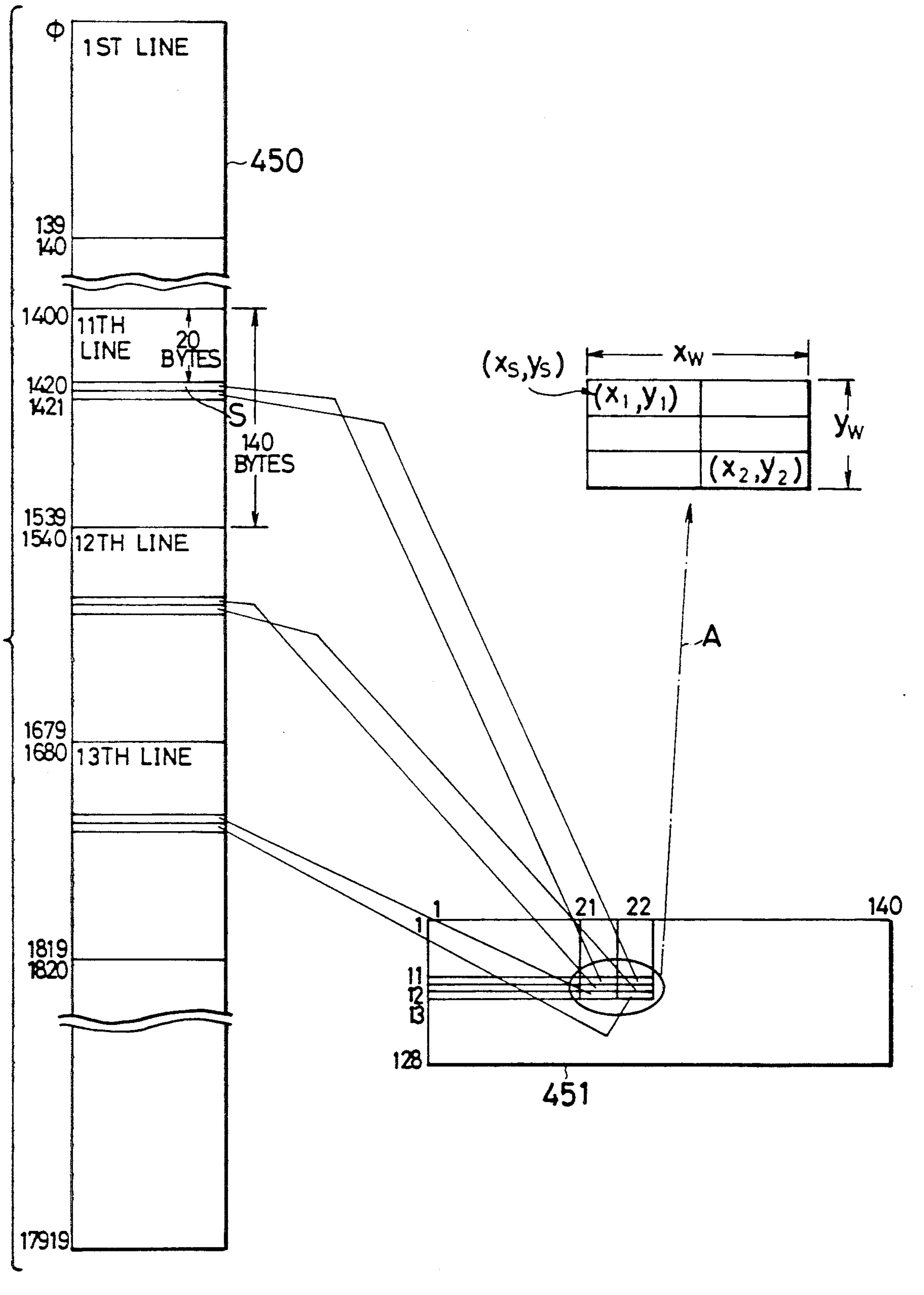

The task for painting out an area in which the two two-dimensional coordinates are made diagonal each other in the portion in which the other embodiment of this copying machine is embodied with one color will be described with reference to FIG. 21. That is, in order to complete this task, coordinate x, coordinate y (xs, ys), width xw in x-direction and yw in y-direction of the starting point, and information on color needs to be obtained. That is, by obtaining the two-dimensional coordinate information ($x_1$, $y_1$), ($x_2$, $y_2$) of the starting point and the finish point of the task, it can be obtained as follows:

$$xs=x1$$

$$ys=y1$$

$$xw=x2-x1+1$$

$$yw=y2-y1+1$$

Furthermore, starting point S of the area on the display controller memory 450 can be obtained from the following equation:

$$S=140\times(y1-1)+(x1-1)$$

Figure 22:
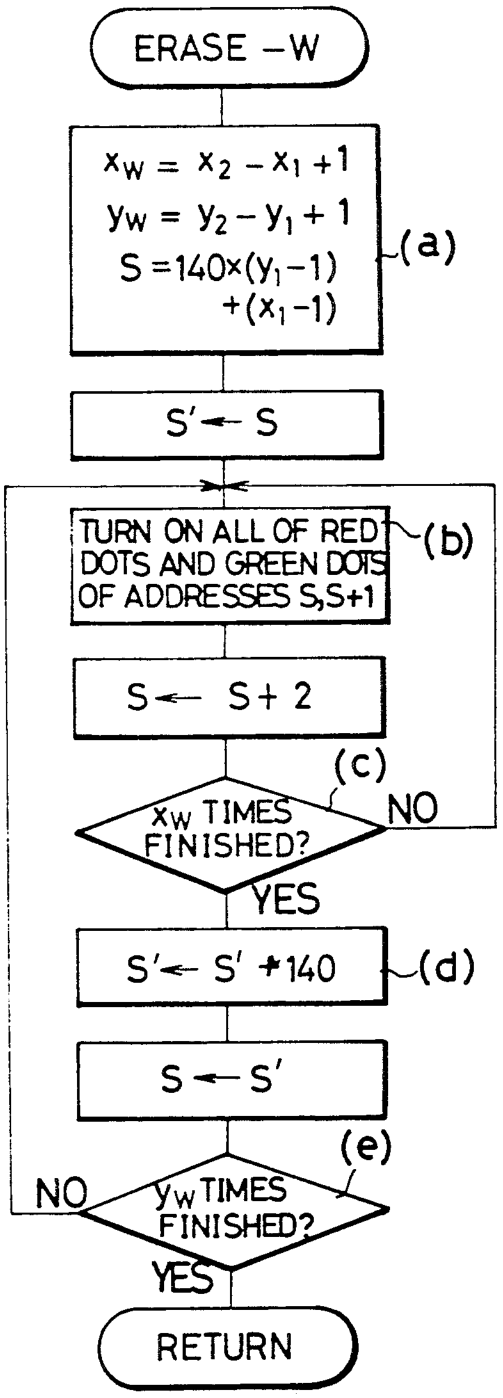
FIGS. 22(*a*)-21(*c*) are a view illustrating the portion of the copying which the other embodiment is embodied.

FIG. 22 is a flow chart of a macro in which the area is paint out with white in accordance with the two two-dimensional coordinate information. The operation controlling microprocessor 443 execute the macro from the same from the mode controlling microprocessor 422, wherein xw, yw, and S are obtained by the two dimensional coordinate information ($x_1$, $y_1$), ($x_2$, $y_2$) of the starting point and the finish point from the above-described equation, and S is made S' in step (a). Next, in step (b), in order to make the area white, this area being arranged in such a manner that starting point and finish point ($x_1$, $y_1$), ($x_2$, $y_2$) are made diagonal each other, the red dots and the green dots are, as the data on turning on, written on the display controller memory 450, and the width in the x-axis thereof is controlled in step (c). This write task is performed in such a manner that, a process arranged as that when the first line is completed, the flow is shifted to the next line in step (d) is repeated, and width in y-axis is controlled by step (e).

Each of macros to paint out th area with the colors other than white (black, red, green) in accordance with the two two-dimensional coordinate information is arranged simply by changing the contents of step (b) of the macro shown in FIG. 22 into the above-described contents shown in Table 2. That is, the contents of step (b) is arranged to be: in a macro to paint out the area with black, red dots are made data on turning off, while red dots are made data on turned off as to be written on the display controller memory 450. In the macro to paint out the area with red, the red dots are made data on turning on, while the green dots are made data on turning off as to be written on the display controller memory 450. In the macro to paint out the area with green, the red dots are made data on turning off, while the green dots are made data on turning on as to be written in the display controller memory 450. The operation controlling microprocessor 443 executes the macro when such macro is sent from the mode controlling microprocessor 422.

The task in the portion of this copying machine in which the other embodiment is embodied , that is, the task in which data which has been previously registered in the dot display means by making one two-dimensional coordinate information a starting point is displayed with two colors optionally selected from red, green, white, and black will be described with reference to FIG. 23. In order to complete this task, x and y coordinates (xs, ys) of the starting point, widths xw and yw in x and y-directions, and color combination information needs to be obtained. If the starting point ($x_1$, $y_1$) is given, since $$xs = x1$$

$$ys = y1,$$

starting point S on the one-dimensional display controller memory 450 can be obtained from $$S = 140 \times (y1 - 1) + (x1 - 1).$$

Figure 23:
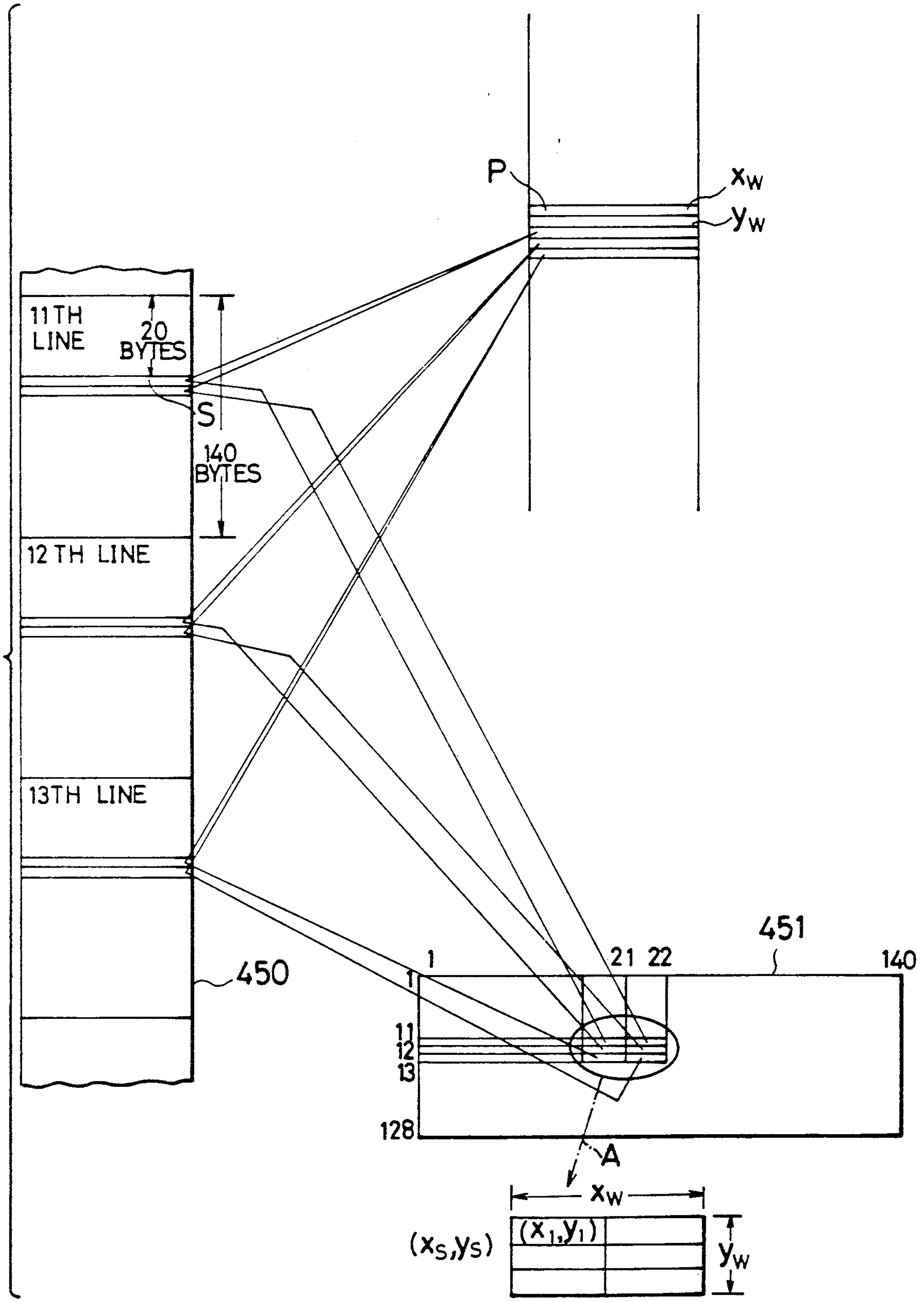
FIGS. 23(*a*)-23(*c*) are a view illustrating the portion or the copying machine in which another modified example is embodied.

Furthermore, xw and yw can be obtained by storing them in the front two bytes of data which has been previously registered, as shown in FIG. 23 (*a*). Memory address P in which the previously registered data has been stored needs, of course, to be acknowledged.

Figure 24:
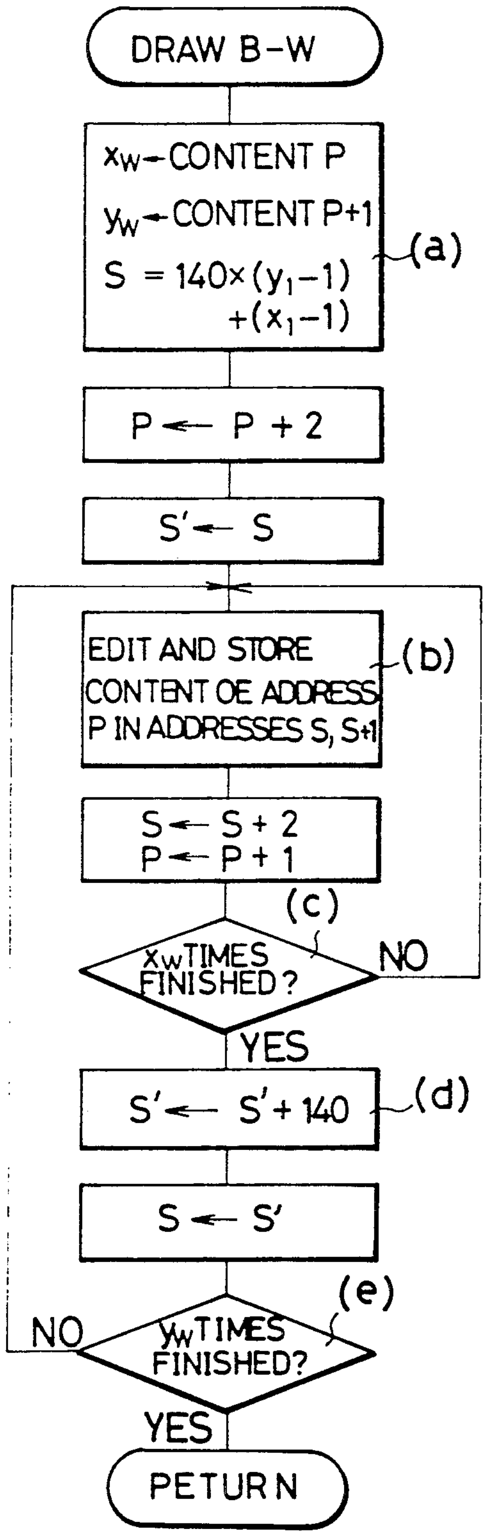
FIG. 24 is a view illustrating a flow chart showing another macro used in the copying machine.

FIG. 24 is a flow chart of a macro to draw data in such a manner that white is drawn on black base, this data being data which has been registered in the dot display means making one two-dimensional coordinate information as the starting point. The operation controlling microprocessor 443 executes the macro in response to the macro from the mode controlling microprocessor 422. In step (a), xw, yw, and S are obtained as described above by using the two dimensional coordinate information ($x_1$, $y_1$) and address P. Next, in order to draw white on the black base, data which has been emitted in step (b) is transferred, wherein the edition represents, as described with reference to FIG. 16, a task of turning data which has been previously registered. The thus-turned data is written in the display controller memory 450, and the width in x-axis direction is controlled in step (c). This write task is arranged to repeat a process that is formed in such a manner that when the first line is completed the process is shifted to the next line in step (d), and the width in y-axis direction is controlled in step (e).

Each of macros to draw data which has been previously registered with the above-described one two-dimensional coordinate information made a starting point with colors other than that of the above-described macro is formed by simply changing the contents of the edition in step (b) for the macro shown in FIG. 24 into the contents shown in Table 3. That is, the edition in step (b) in a case of, for example, a macro to draw a black graphic on a white base in the dot display means 4, is performed in the dot display means 451, as shown in FIG. 17, in such a manner that the previously registered data of 2 bytes formed by 8 red dots and the same green dots is stored in the display controller memory 450 in such a manner that the 8 green dots and the 8 red dots are turned. In the macro to draw a red graphic on a green base in the dot display means 451, as shown in FIG. 18, the previously registered data of 2 bytes formed by 8 green dots and 8 red dots is each stored in the display controller memory 450 in such a manner that the 8 green dots are turned, and the 8 red dots are not turned as it is. In the macro to draw white graphic on a green base in the hot display means 451, as shown in FIG. 19, the previously registered two bytes formed by 8 red dots and 8 green dots is stored in the display controller memory in such a manner that the 8 red dots is stored in the display controller memory 450, while data on all are turned on of the 8 green dots is stored in the display controller memory regardless of the previously registered data, and the edition for each of macros is changed into those shown in Table 4.

The task in the portion of this copying machine in which a still further modified example is embodied, that is, the task in which data which has been previously registered in the dot display means by making one two-dimensional coordinate information a starting point is displayed with three or all of 4 colors optionally selected from red, green, white, and black will be described with reference to FIG. 19 In order to complete this task, x and y coordinates (xs, ys) of the starting point, widths xw and yw in x and y-direction are needed to be given. If the starting point ($x_1$, $y_1$) is given, since $$xs = x1$$

$$ys = y1,$$

starting point S on the one-dimensional display controller memory 450 can be obtained from $$S = 140 \times (y1 - 1) + (x1 - 1).$$

Figure 25:
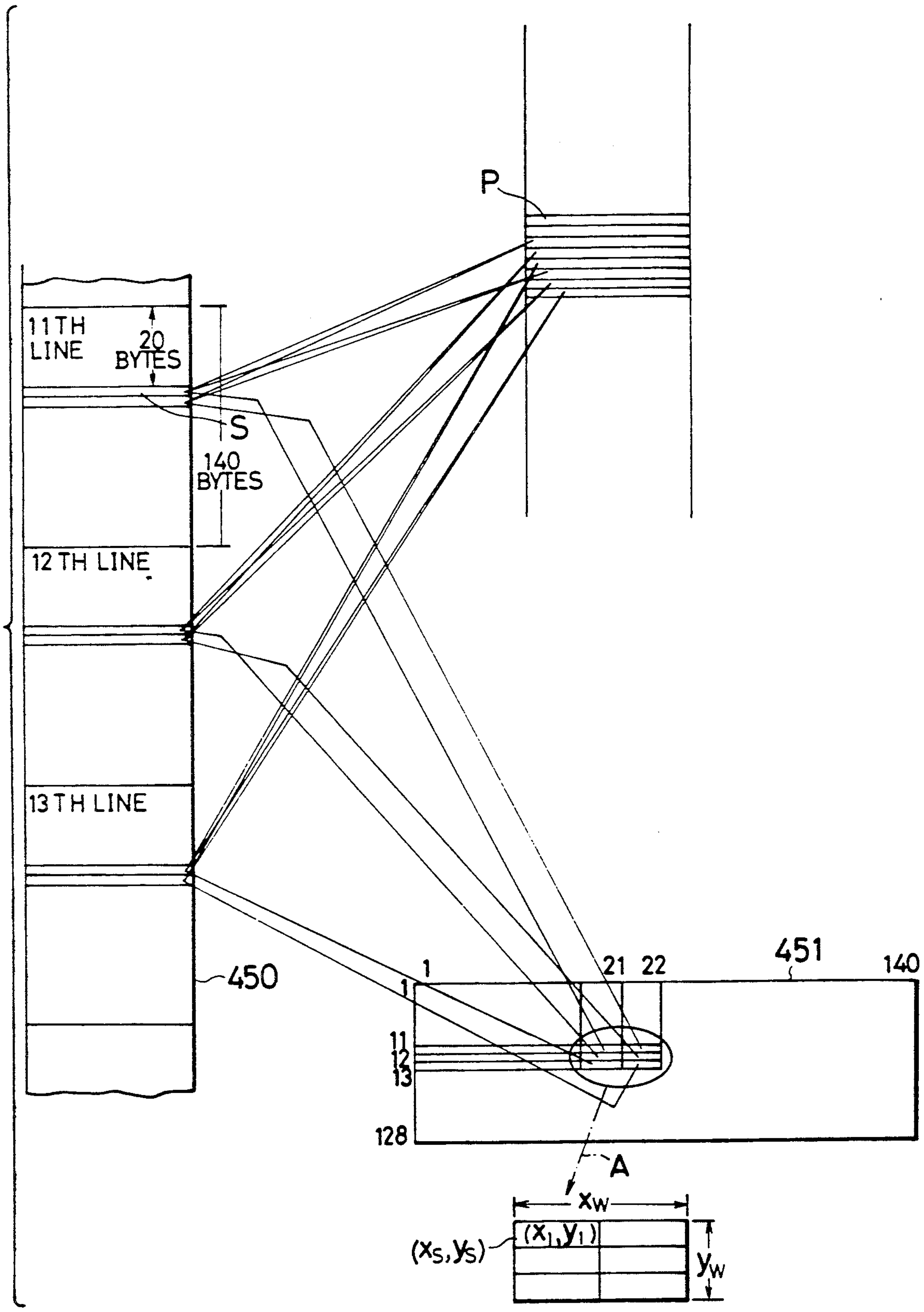
FIGS. 25(*a*)-25(*c*) are a view illustrating the portion of the copying machine in which a still further modified example is embodied.
Figure 26:
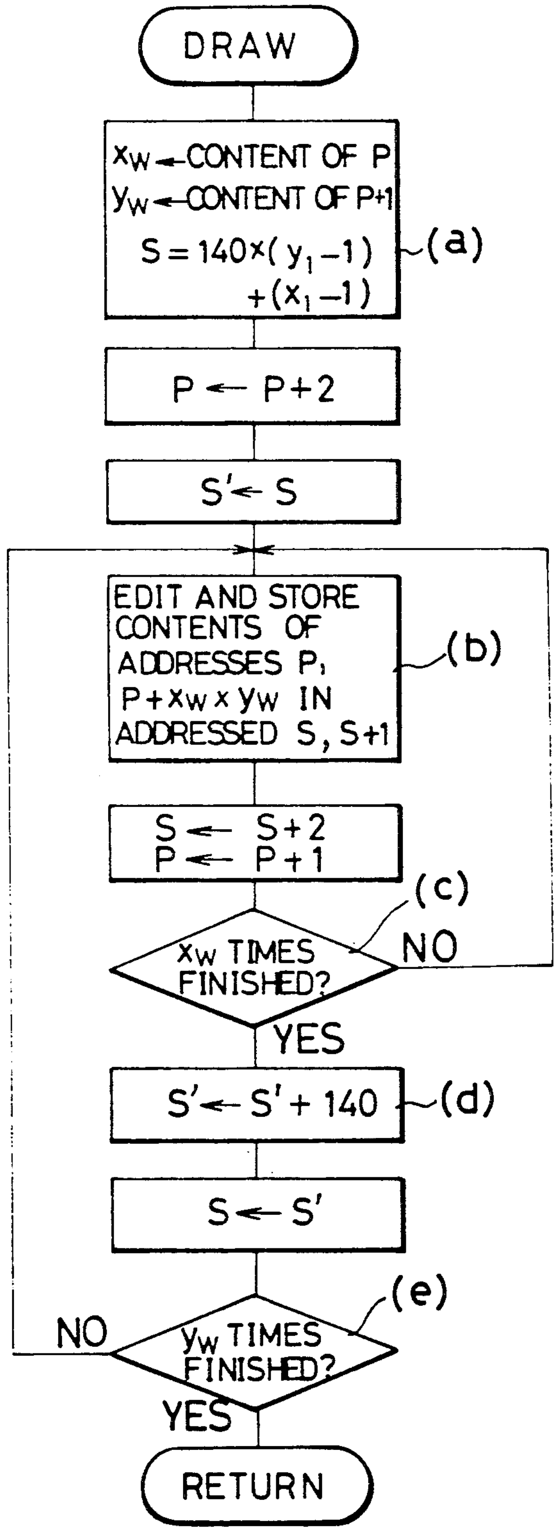
FIG. 26 is a view illustrating a flow chart showing another macro used in the copying machine.

Furthermore, xw and yw can be obtained by storing them in the front two bytes of data which has been previously registered, as shown in FIG. 25 (*a*). Memory address P in which the previously registered data has been stored needs, of course, to be acknowledged. FIG. 26 is a flow chart of a macro to draw data which has been registered in the dot display means by making one two-dimensional coordinate information a starting point with optionally selected three or four colors. The operation controlling microprocessor 443 executes the macro in accordance with the macro supplied from the mode controlling microprocessor 422. In step (a), xw, yw and S are obtained as described above from the two-dimensional coordinate information $(x_1, y_1)$ of the starting point and address P. Next, in step (b), the contents of P and P+xw×yw is editted as to be stored in addresses S and S+1. That is, red dot information is stored in address P, while green dot information is stored in address P+xw×yw. The red dot information and the green dot information are stored, as shown in FIG. 20, in the display controller memory 450. This write task is performed in such a manner that the width in x-axis direction is controlled in step (c), and when the first line is completed, the process is shifted to the next line in step (d), and this process is repeated. The width in the y-axis direction is controlled in step (e).

The above-described macros are summarized as follows:

1. ERASE-W Macro to paint out the area in which $(x_1, y_1, x_2, y_2)$:$(x_1, y_1)$ is made a starting point and (xz, yz) is made a finish point with white
2. ERASE-B Macro to paint out the area in which $(x_1, y_1, x_2, y_2)$:$(x_1, y_1)$ is made a starting point and (xz, yz) is made a finish point with black
3. ERASE-R Macro to paint out the area in which $(x_1, y_1, x_2, y_2)$:$(x_1, y_1)$ is made a starting point and (xz, yz) is made a finish point with red
4. ERASE-G Macro to paint out the area in which $(x_1, y_1, x_2, y_2)$:$(x_1, y_1)$ is made a starting point and (xz, yz) is made a finish point with green
5. DRAW-B-W Macro to draw the contents of P with white on black base in the area in which $(x_1, y_1, P)$:$(x_1, y_1)$ is made a starting point
6. DRAW-R-W Macro to draw the contents of P with white on red base in the area in which $(x_1, y_1, P)$:$(x_1, y_1)$ is made a starting point
7. DRAW-G-W Macro to draw the contents of P with white on green base in the area in which $(x_1, y_1, P)$:$(x_1, y_1)$ is made a starting point
8. DRAW-W-B Macro to draw the contents of P with black on white base in the area in which $(x_1, y_1, P)$:$(x_1, y_1)$ is made a starting point
9. DRAW-R-B Macro to draw the contents of P with black on red base in the area in which $(x_1, y_1, P)$:$(x_1, y_1)$ is made a starting point
10. DRAW-G-B Macro to draw the contents of P with black on green base in the area in which $(x_1, y_1, P)$:$(x_1, y_1)$ is made a starting point
11. DRAW-W-R Macro to draw the contents of P with red on white base in the area in which $(x_1, y_1, P)$:$(x_1, y_1)$ is made a starting point
12. DRAW-B-R Macro to draw the contents of P with red on black base in the area in which $(x_1, y_1, P)$:$(x_1, y_1)$ is made a starting point
13. DRAW-G-R Macro to draw the contents of P with red on green base in the area in which $(x_1, y_1, P)$:$(x_1, y_1)$ is made a starting point
14. DRAW-W-G Macro to draw the contents of P with green on white base in the area in which $(x_1, y_1, P)$:$(x_1, y_1)$ made a starting point
15. DRAW-B-G Macro to draw the contents of P with green on black base in the area in which $(x_1, y_1, P)$:$(x_1, y_1)$ made a starting point
16. DRAW-R-G Macro to draw the contents of P with green on red base in the area in which $(x_1, y_1, P)$:$(x_1, y_1)$ made a starting point
17. DRAW Macro to draw the contents of P with three or four colors in the area in which $(x_1, y_1, P)$:$(x_1, y_1)$ made a starting point wherein $(x_1, y_1)$ represents a drawing starting point, (xz, yz) represents the finishing point, P represents an address in which the previously registered data is stored and is used as an argument of the macro.

Figure 30:
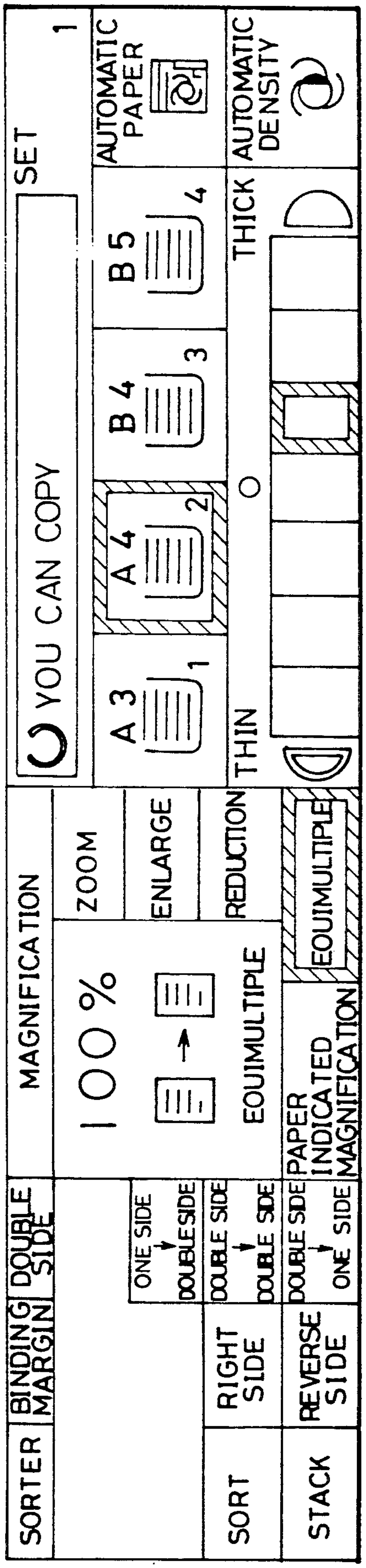
FIGS. 30 to 34 are views illustrating examples of display performed by the switch display portion of the copying machine.

FIGS. 30 to 34 illustrate the examples of the display realized by the switch and display portion of this copying machine. FIG. 30 illustrates the display for performing the copying function in which sorter, binding margin, double side, magnification, paper supplying tray, and density are displayed. The switch and display portion of this copying machine is as well used as an input means by layering a substantially transparent touch panel on the dot display means. Therefore, the color classification needs to be provided in such a manner, for example, red corresponds to the push switch, white and black mere message, red abnormal matter such as paper catch or door open. Therefore, the present invention is thus embodied.

Figure 31:
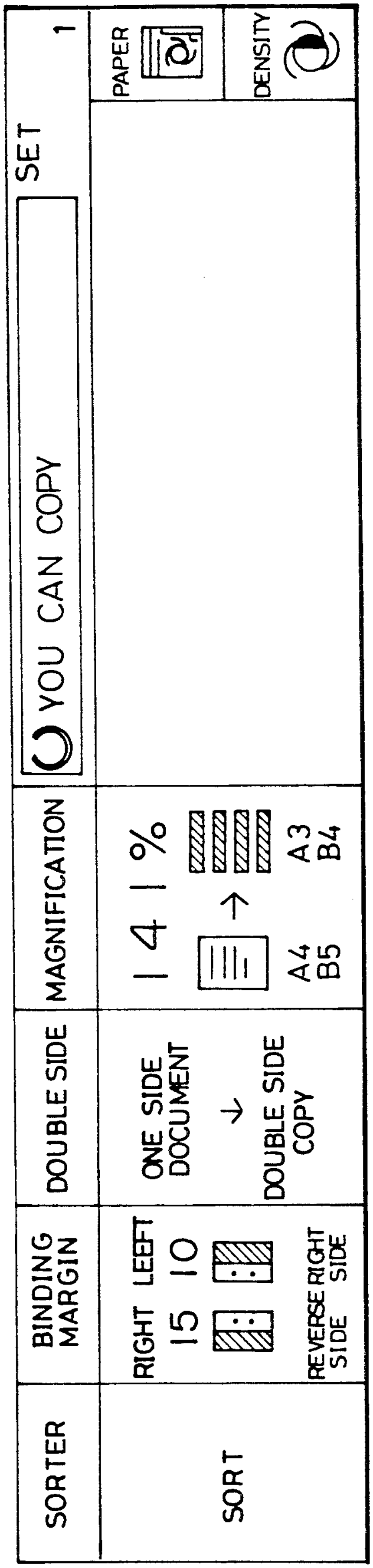

FIG. 31 illustrates a second display for performing the copying operation. The reason why the display can be changed at needs lies in that the dot display means is included therein and the optional color display can be performed according to the present invention.

Figure 32:
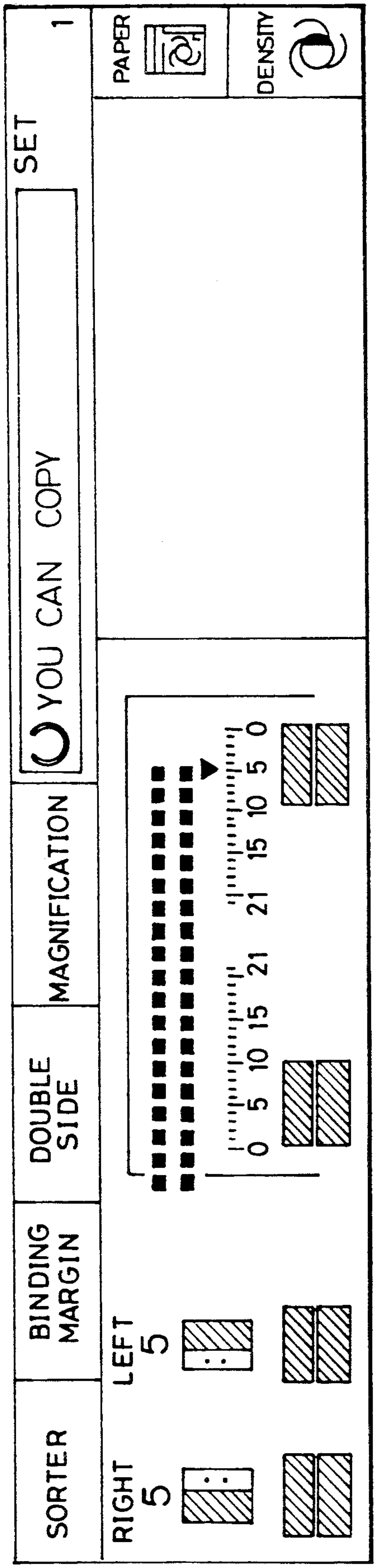

FIG. 32 illustrates the display when the display shown in FIG. 31 is operated in such a manner that the binding margin is pushed down. According to this display, users can easily operate this display.

Figure 33:
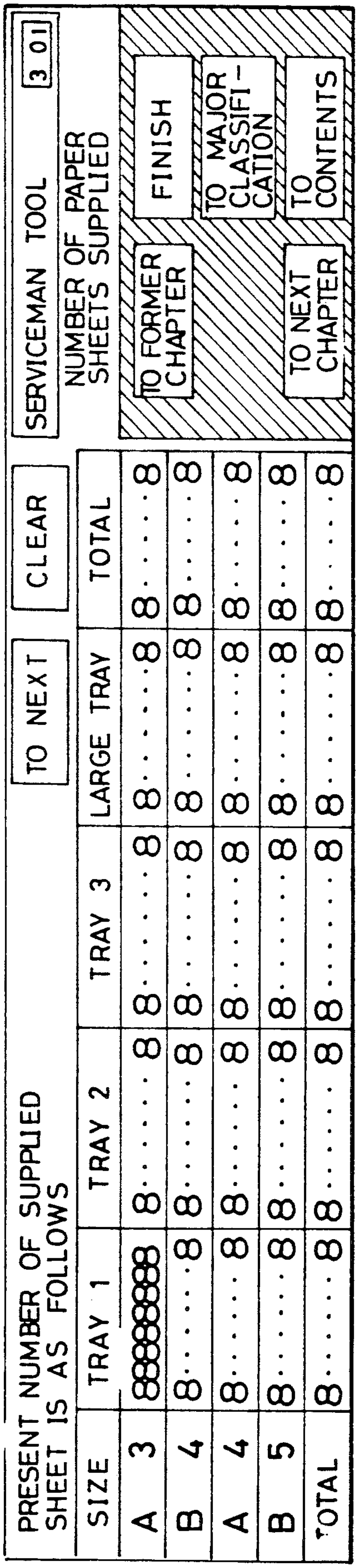

FIG. 33 illustrates a data logging display for obtaining the number of paper sheets corresponding to each of the trays and in accordance with the size of the paper sheets.

Figure 34:
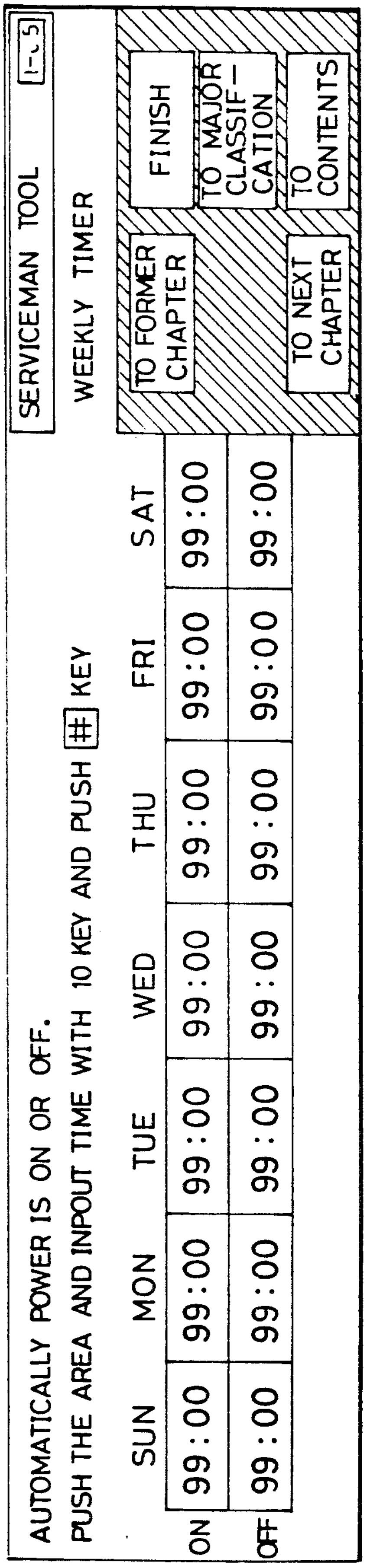

FIG. 34 illustrates a display for determining an weekly timer which automatically turns on/off the power source.

According to the other embodiment, it is provided a display control method wherein the display information in which the coordinate information is made the two-dimensional information comprises a macro to paint out an area with a color selected from red, green, white, and black in accordance with two two-dimensional coordinate information, whereby the contents in the storing means which corresponds to information in the area in which the two two-dimensional coordinate information are made diagonal each other is rewritten by the calculating means in accordance with the macro into data of a color selected from red, green, white, and black, and information in the area is erased from the displaying means as to realize a display of the thus-selected one color.

Therefore, the precessing speed can be raised, data can be compressed with a simple method, and restriction upon the display positions and color can be suspended.

According to the other embodiment, present invention is characterized by a display control method wherein said display information in which said coordinate information is made said two-dimensional coordinate information comprises a macro to display data which has been previously registered with one two-dimensional coordinate information with two colors optionally selected from red, green, white, and black, wherein said data is, in accordance with said macro, stored in said storing means as to be displayed by said display means after said data has been subjected to an edition by said calculating means by making said two dimensional coordinate information a starting point.

Therefore, the precessing speed can be raised, data can be compressed with a simple method, and restriction upon the display positions and color can be suspended.

Furthermore, according to the other embodiment of the present invention, a display control means is provided wherein the display information in which the coordinate information is made two-dimensional coordinate information comprises a macro to display data which has been previously registered with one two-dimensional coordinate information with optional three colors selected from or all of four colors of red, green, white, and black, wherein the data is, in accordance with the macro, stored in the storing means as to be displayed by the display means by making the two-dimensional coordinate information a starting point by the calculating means.

Therefore, the precessing speed can be improved, data can be compressed with a simple method, and restriction upon the display positions and color can be suspended.

Figure 35A:
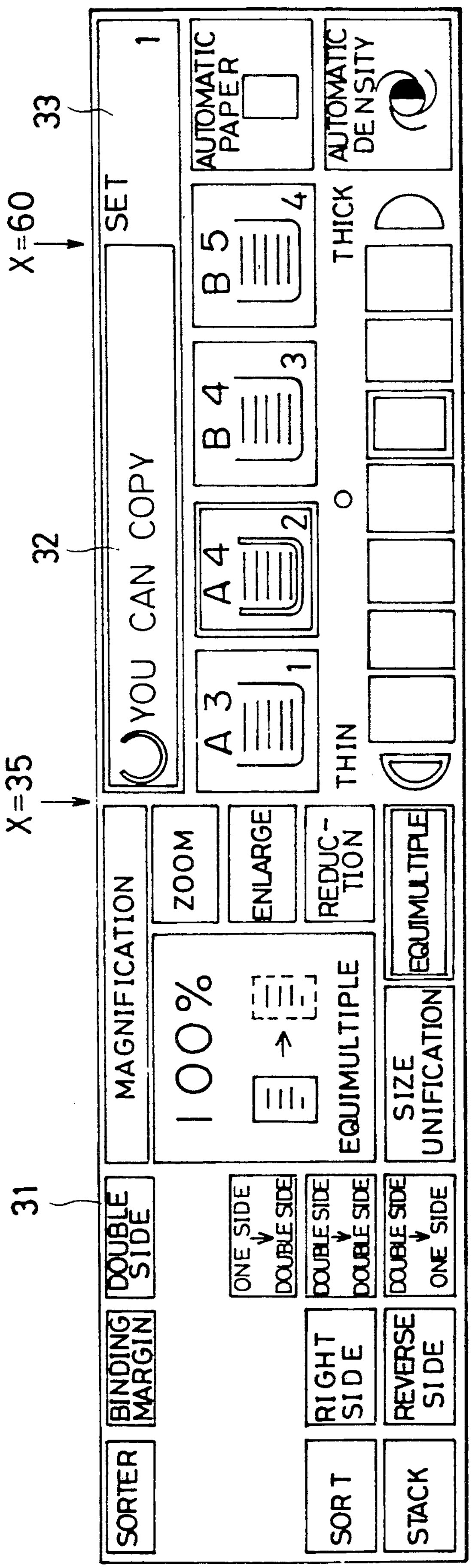
FIGS. 35(*a*)-35(*c*) are a plan view illustrating an example of display according to second embodiment of a display control device according to the present invention.
Figure 35B:
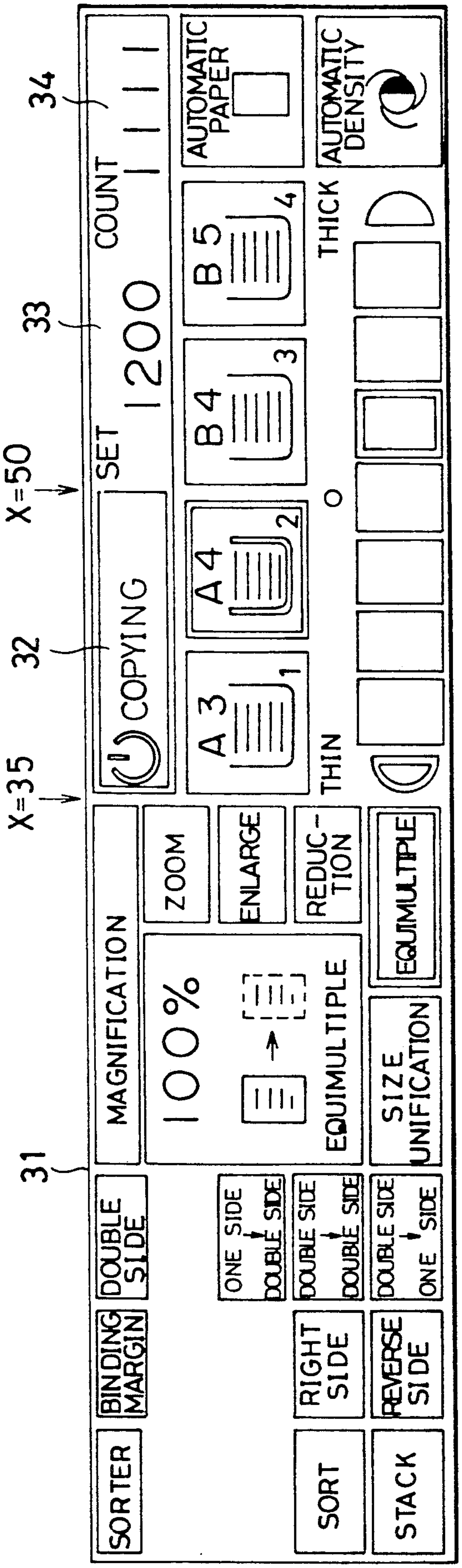
Figure 35C:
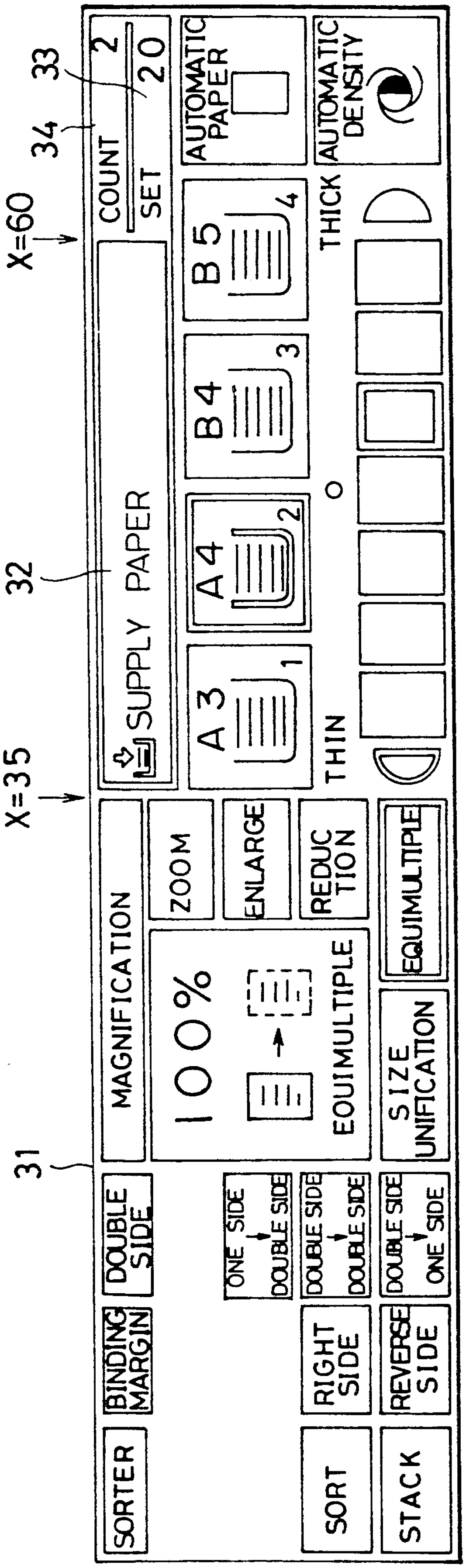
Figure 36:
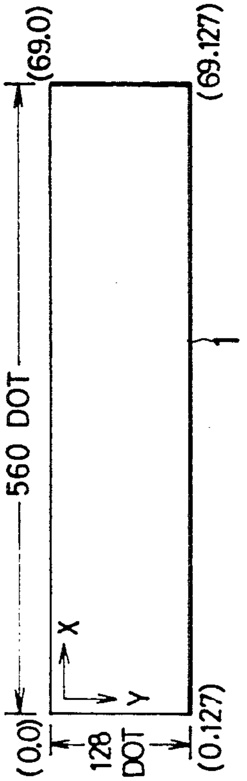
FIG. 36 is a view illustrating a coordinate.

The liquid crystal display 31 of a full dot structure disposed on the operation panel is as shown in FIG. 35. The overall display area is structured to have the size defined by x and y coordinates shown in FIG. 36. That is, assuming that the upper left corner is an origin (0, 0), the area is formed by 128 dots×560 dots (70 bytes).

Such a liquid crystal display 31 is usually arranged to display selective and formative information regarding of function modes of the copying machine such as "sorter", "binding margin", "sort", "stack", and "magnification". In this case, a message display area 32, area 33 for displaying the number of the set paper sheet, and an area 34 for displaying the number of paper sheets to be copied are disposed in the upper right portion of this display. Although these displaying areas 32, 33, and 34 are arranged to have the fixed size in the conventional display, the size thereof can be varied according to the embodiment of the present invention. That is, in order to change the area of the message displaying area 32 to correspond to the state of the copying machine, the manner to display the number of the set paper sheets and the number of copies are changed.

An example of a change of the display method will be described with reference to FIG. 35.

FIG. 35 (*a*) illustrates an example of the display realized before start copying. That is, the message regarding to the state of this copying machine is arranged to be "Wait", "You can copy", and so on. In this state where the copying has not as yet been started, the copying action is, of course, not conducted. Therefore, the number of the copies is zero, and the display of the number of copies does not need to be realized. As a result, the area 34 for displaying the number of copies is omitted, and thereby the message display area 32 is enlarged. That is, referring to x-coordinate, the area from the X=35 to X=60 is arranged to be the message display area 32.

FIG. 35 (*b*) illustrates an example of the display realized during the copying operation. In this case, the display regarding to the state of the copying machine needs to be a simple message such as "Copying" or the like. In addition, in order to notify the stage of the copying operation (advance in the process), the number of copies needs to be displayed in addition to the number of the set paper sheet. Therefore, in order to display the message, the number of the set paper sheets, and the number of copies in an transversely aligned manner, the displaying areas 32, 33, and 34 need to be secured. That is, the above-described state is the basic area assignment condition, wherein the message displaying area 323 is defined by the position X=35 and X=50. Thus, this area is reduced in size.

Furthermore, FIG. 35 (*c*) illustrates an example of a display which corresponds to a case where an error occurs in the copying operation. In this case, the display upon the state of the copying machine is arranged to be an alarm message such as "Supply paper", "Supply toner", or the like which is formed by a great number of characters in general. However, it is during the copying operation, therefore, the display upon the number of copies preferably not to be omitted as shown in FIG. 35 (*a*). In this case, therefore, the area 33 for displaying the number of the set paper sheets and the area 34 for displaying the number of copies are displayed in two stage as that for use to express the fraction. In addition, the message displaying area 32 is, as shown in FIG. 35 (*a*), is enlarged. That is, x-coordinate of the message displaying area 32 is arranged to be 35 to 60. As a result, the alarm message can be sufficiently displayed.

As described above, by changing state of the display of the number of the set paper sheets and the number of copies in accordance with the state of the copying machine, the message display area 32 can be varied in the displaying area. As a result, the necessary information upon the state of the copying machine can be displayed easily. In addition, since the positions of the displays of the modes are not changed, the mode displays are always performed in the same position, causing the operability to be improved.

Figure 37:
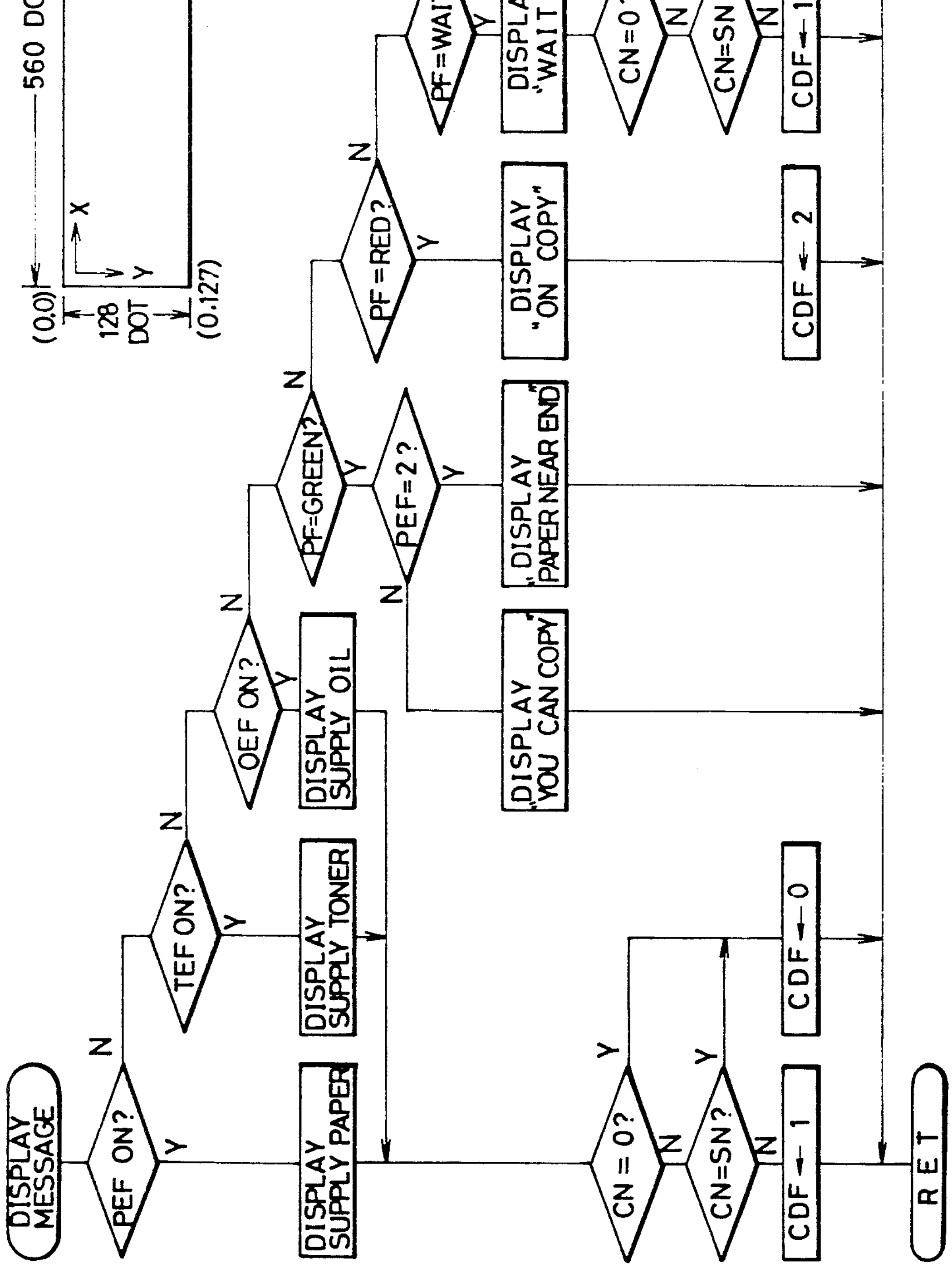
FIG. 37 is a flow chart upon a message display process.
Figure 38I:
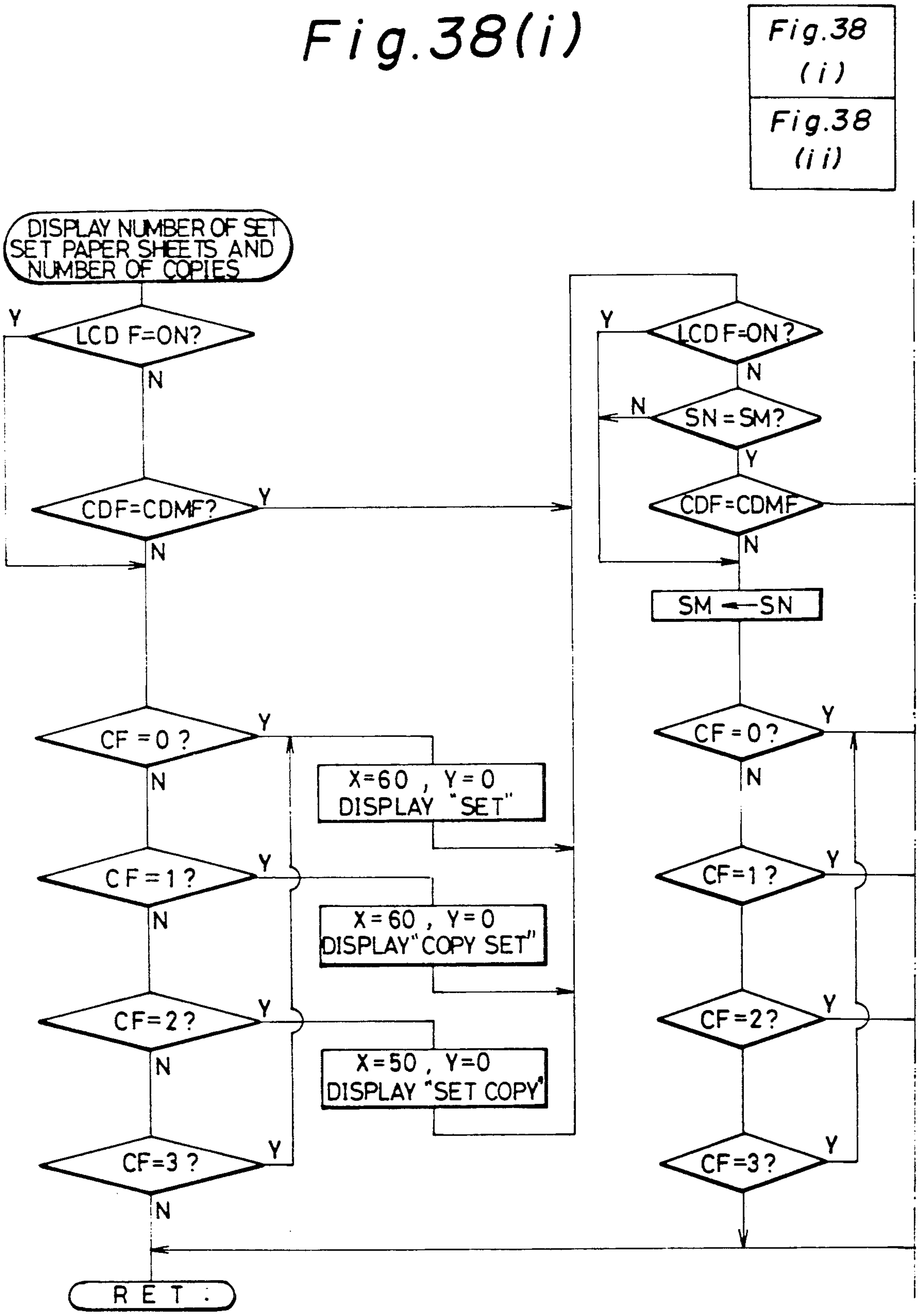
FIGS. 38(*i*) and 38(*ii*) are a flow chart upon a display process of the number of paper sheets to be set and the number of copies.
Figure 38:
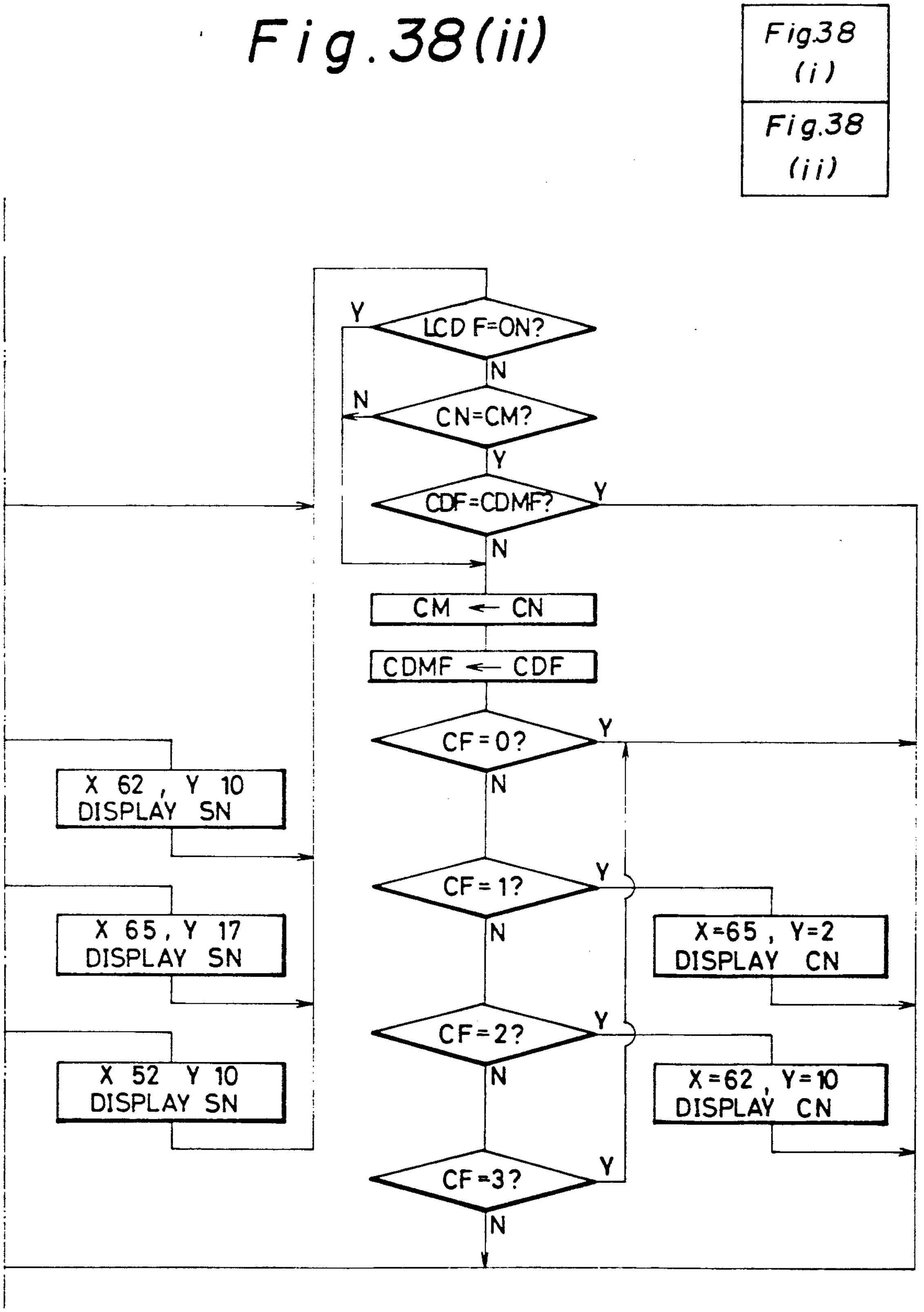

The above-described message display control and the control of displaying the number of the set paper sheets/the number of copies are performed in accordance with a flow chart shown in FIGS. 37 and 38 by a microcomputer (omitted from illustration) which serves as a display control means.

First, the control of the message display will be described with reference to FIG. 37. If paper end flag PEF is turned on, message "Supply paper" is displayed in the message displaying area 32 at X=35, Y=0. This state is illustrated in FIG. 35 (*c*). In this case, if the number of copies is made zero or same as the number of the set paper sheet, count display flag CDF is set to 0. If not, the counter display flag CDF is set to 1. If paper end flag PEF is not turned on, and if toner end flag TEF is turned on, message "Supply toner" is displayed in the message displaying area 32 at X=35, Y=0. In this case, the control of the count display flag CDF is performed in the same manner as that described above. Furthermore, if the oil end flag OFF is turned on, message "Supply oil" is displayed in the message displaying area 32 at X=35, Y=0. In this case, the control of the count display flag CDF is performed in the same manner as that described above. If the paper end flag PEF is near end (=2) in state where the print flag PF is green G, message "Paper near end" is displayed in the message displaying area 2 at X=35, Y=0. If not, message "You can copy" is displayed in the message displaying area 32 at X=35, Y=0. This is the case shown in FIG. 35 (*a*).

On the other hand, if the print flag PF is red R, message "Copying" is displayed in the message displaying area 32 at X=35, Y=0. This is the case shown in FIG. 35 (*b*). Then, the count display flag is set to 2;

If the print flag PF is wait, message "Wait" is displayed in the message displaying area 32 at X=35, Y=0. At this time, if the number of copies is the same as the number of the set paper sheet, the count display flag CDF is set to 3. If not, the count display flag CDF is set to 1.

On the other hand, control of the number of the set paper sheet and the number of copies will be described with reference to FIG. 38. If in a state where LCD flag (LCDF) is turned on or the count display flag CDF is not the same as count display memory flag CDMF, the count flag CF=CDF is 0, the area 33 for displaying the number of the set paper sheets is disposed as shown in FIG. 35 (a) at X=60, Y=0, and characters "Set" is displayed. If the count flag CF is 1, the area 34 for displaying the number of copies and the area 33 for displaying the set paper sheet are, as shown in FIG. 35 (*c*), disposed to form two stage at position X=60, Y=0, and characters "Copy" and "Set" are displayed to form the two stages. If the count flag CF is 2, the area 34 for displaying the number of copies and the area 33 for displaying the set paper sheet are arranged in the transverse direction from position defined by X=50, Y=0. The characters "Set" and "Copy" are each displayed in the corresponding areas. If the count flag CF is 3, the area 33 for displaying the set paper sheet is disposed, as shown in FIG. 35 (*a*) at X=60, Y=0, and characters "Set" are displayed.

Next, if the LCD flag (LCDF) is turned on, if the count display flag CDF does not align to the count display memory flat CDMF, or if the count display flag CDF does not align to the count display memory flag CDMF, the set number of sheets counter SN is substituted at a set memory counter SM. In this state, if the count flag CF is 0, the number of set paper sheet is, as shown in FIG. 35 (*a*), displayed at X=62, Y=10. If the count flag CF is 1, the number of the set paper sheet is with small letters, displayed, as shown in FIG. 35 (*c*), at X=65, Y=17. If the count flag CF is 2, the number of the set paper sheet is, as shown in FIG. 35 (*b*), displayed at X=52, Y=10. Furthermore, if the count flag CF is 3, the number of the set paper sheet is, as shown in FIG. 35 (*a*), displayed at X=62, Y=10. If the LCD flag (LCDF) is turned on, if the count display flag CDF does not align to the count display memory flag CDMF, or if the count display flag CDF does not align to the count display memory flag CDMF, the copy number counter CN is substituted at a copy number memory counter CM and the count display flag CDF is substituted at the count display memory flag CDMF. If the count display flag CDF is 1 at this time, the number of copies is, with small letters, displayed, as shown in FIG. 35 (*c*) at X=65, Y=2. If the count display flag CDF is 2, the number of copies is displayed, as shown in FIG. 35 (*b*), at X=62, Y=10. If the count display flag CDF is 0 or 3, nothing is displayed.

What is claimed is:

1. A method of controlling a display for copying machine including a memory means for storing a plurality of data defining informations to be displayed and a plurality of display color informations defining colors with respect to the informations to be displayed, a dot display means for displaying the information with at least one color selected from the group consisting of four colors of red, green, white and black thereon, said dot display means having a plurality of first dots for illuminating red color and a plurality of second dots for illuminating green color, the first dots and the second dots being alternately arranged with each other for displaying the information and a data processing means for processing the data and the display color informations stored respectively in said memory means to display the information on said dot display means, comprising the steps of:

selecting respectively one datum defining the information to be displayed out of the data stored in said memory means and one display color information defining the colors with respect to the information to be displayed out of the display color informations stored in said memory means by said data processing means in order to set the information to be displayed;

transmitting respectively the selected one datum and the selected one display color information to said dot display means by means of said data processing means; and illuminating at least one of the first dots and the second dots by means of said dot display means based on said one datum and said one display color information transmitted respectively to said dot display means by means of said data processing means in such a manner that the information with at least one color is displayed on said dot display means.

2. A method according to claim 1, further comprising:

the step of selecting the one datum and the one display color information by means of said data processing means for displaying a predetermined displaying area with the one color on said dot display means.

3. A method according to claim 1, further comprising:

the step of selecting the one datum and the one display color information by means of said data processing means for displaying a predetermined displaying area with the one color on said dot display means.

4. A method according to claim 1, further comprising:

the step of selecting the one datum for preventing the illuminating of the first dots and second dots by means of said data processing means.

5. A method according to claim 1, further comprising:

the step of selecting the one datum and the one display color information by means of said data processing means for displaying a predetermined displaying area with the one color on said dot display means.

6. A display control device for a copying machine comprising:

a displaying means for displaying copying conditions with one of a first displaying mode and a second displaying mode, said first displaying mode being comprised of a first display for displaying a plurality of displaying mode items to be designated and a second display for displaying setting conditions of designated displaying mode items, said first display and said second display being displayed in a same picture, said second displaying mode being comprised of a third display for displaying a plurality of another displaying mode items to be designated and a fourth display for displaying another setting conditions of designated another displaying mode items, said fourth display being displayed after said third display is displayed in another picture different from that of said fourth display;

a determining means formed as a transparent sheet-like matrix touch switch and layered on said displaying means for determining the copying conditions defined by one of said first displaying mode and said second displaying mode on the basis of detected results of respective touched positions with respect to the respective displayed pictures; and means for setting the copying conditions determined by said determining means.

7. A display control device according to claim 6, in which said displaying means comprising:

a liquid crystal and a fluorescent display.

8. A display control device according to claim 6, in which said copying conditions concern information and functions such as information on transfer paper supply cassettes, information on a density, a magnification function and double side functions.

9. A display control device for a copying machine, comprising:

a full dot liquid crystal display for displaying messages, such as a number of copies and a number of set paper sheet, in copy operation; and a display size control means for changing a size of each of message displaying areas in a display area of said full dot liquid crystal display in response to an amount of information defined by the messages to be displayed in said display area of said full dot liquid crystal display.

* * * * *